United States Patent
Moshfeghi

(10) Patent No.: US 10,931,414 B2
(45) Date of Patent: *Feb. 23, 2021

(54) METHOD AND SYSTEM FOR A REPEATER NETWORK THAT UTILIZES DISTRIBUTED TRANSCEIVERS WITH ARRAY PROCESSING

(71) Applicant: Golba LLC

(72) Inventor: Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/153,735

(22) Filed: Oct. 6, 2018

(65) Prior Publication Data

US 2019/0123866 A1 Apr. 25, 2019

Related U.S. Application Data

(63) Continuation of application No. 15/853,537, filed on Dec. 22, 2017, now Pat. No. 10,103,853, which is a
(Continued)

(51) Int. Cl.
*H04L 5/00* (2006.01)
*H04L 27/12* (2006.01)
(Continued)

(52) U.S. Cl.
CPC ............. *H04L 5/0032* (2013.01); *H04B 1/40* (2013.01); *H04B 7/024* (2013.01); *H04B 7/043* (2013.01);
(Continued)

(58) Field of Classification Search
CPC .......... C23C 16/0227; C23C 16/45565; C23C 16/45578; C23C 16/4584; C23C 16/52;
(Continued)

(56) References Cited

U.S. PATENT DOCUMENTS

| 3,618,097 A | 11/1971 | Mcleod, Jr. |
| 3,835,469 A | 9/1974 | Chen et al. |

(Continued)

FOREIGN PATENT DOCUMENTS

| EP | 1890441 A2 | 2/2008 |
| EP | 1890441 A3 | 3/2013 |

(Continued)

OTHER PUBLICATIONS

Corrected Notice of Allowability for U.S. Appl. No. 16/111,326 dated Mar. 9, 2020.
(Continued)

*Primary Examiner* — Tan H Trinh
(74) *Attorney, Agent, or Firm* — Chip Law Group

(57) ABSTRACT

A device that comprises a plurality of distributed transceivers, a central processor and a network management engine may be configured to function as relay device, relaying an input data stream from a source device to at least one other device. The relaying may include configuring one or more of the plurality of distributed transceivers to particular mode of relay operation and receiving the input data stream from the source device via at least one of the configured one or more of the plurality of distributed transceivers. The relaying may also include transmitting at least one relay data stream corresponding to the input data stream to the at least one other device, via at least one of the configured one or more of the plurality of distributed transceivers.

20 Claims, 8 Drawing Sheets

Related U.S. Application Data continuation of application No. 13/473,144, filed on May 16, 2012, now abandoned.

(60) Provisional application No. 61/548,201, filed on Oct. 17, 2011.

(51) Int. Cl.

| | | |
|---|---|---|
| *H04W 4/80* | (2018.01) | |
| *H04B 7/0426* | (2017.01) | |
| *H04B 7/024* | (2017.01) | |
| *H04B 7/0408* | (2017.01) | |
| *H04B 7/0413* | (2017.01) | |
| *H04B 7/06* | (2006.01) | |
| *H04B 7/08* | (2006.01) | |
| *H04W 24/08* | (2009.01) | |
| *H04W 72/04* | (2009.01) | |
| *H04W 72/08* | (2009.01) | |
| *H04W 88/02* | (2009.01) | |
| *H04W 88/06* | (2009.01) | |
| *H04B 1/40* | (2015.01) | |
| *H04W 84/12* | (2009.01) | |

(52) U.S. Cl.
CPC ......... *H04B 7/0408* (2013.01); *H04B 7/0413* (2013.01); *H04B 7/0689* (2013.01); *H04B 7/0897* (2013.01); *H04L 27/12* (2013.01); *H04W 4/80* (2018.02); *H04W 24/08* (2013.01); *H04W 72/046* (2013.01); *H04W 72/0453* (2013.01); *H04W 72/0473* (2013.01); *H04W 72/085* (2013.01); *H04W 88/02* (2013.01); *H04W 88/06* (2013.01); *H04W 84/12* (2013.01); *Y02D 30/70* (2020.08)

(58) Field of Classification Search
CPC ........ H01L 21/67248; H01L 21/67303; H04B 1/40; H04B 7/024; H04B 7/0408; H04B 7/0413; H04B 7/043; H04B 7/0689; H04B 7/0897; H04L 27/12; H04L 5/0032; H04W 24/08; H04W 4/80; H04W 72/0453; H04W 72/046; H04W 72/0473; H04W 72/085; H04W 84/12; H04W 88/02; H04W 88/06; Y02D 70/00; Y02D 70/122; Y02D 70/1242; Y02D 70/1262; Y02D 70/142; Y02D 70/144; Y02D 70/146; Y02D 70/164; Y02D 70/22; Y02D 70/444
USPC .......... 455/11.1, 522, 73; 370/315, 329, 338
See application file for complete search history.

(56) References Cited

U.S. PATENT DOCUMENTS

| | | |
|---|---|---|
| 5,473,602 A | 12/1995 | McKenna et al. |
| 5,479,651 A | 12/1995 | Nakaguchi |
| 5,525,990 A | 6/1996 | Lewis |
| 5,561,850 A | 10/1996 | Makitalo et al. |
| 5,598,173 A | 1/1997 | Forti et al. |
| 5,666,124 A | 9/1997 | Chethik et al. |
| 5,771,017 A | 6/1998 | Dean et al. |
| 5,883,602 A | 3/1999 | Volman |
| 5,905,473 A | 5/1999 | Taenzer |
| 5,936,577 A | 8/1999 | Shoki et al. |
| 5,940,033 A | 8/1999 | Locher et al. |
| 6,018,316 A | 1/2000 | Rudish et al. |
| 6,307,502 B1 | 10/2001 | Marti-Canales et al. |
| 6,405,018 B1 | 6/2002 | Reudink et al. |
| 6,433,920 B1 | 8/2002 | Welch et al. |
| 6,456,252 B1 | 9/2002 | Goyette |
| 6,487,417 B1 | 11/2002 | Rossoni et al. |
| 6,577,631 B1 | 6/2003 | Keenan et al. |
| 6,600,776 B1 | 7/2003 | Alamouti et al. |
| 6,718,159 B1 | 4/2004 | Sato |
| 6,802,035 B2 | 10/2004 | Catreux et al. |
| 6,804,491 B1 | 10/2004 | Uesugi |
| 6,992,622 B1 | 1/2006 | Chiang et al. |
| 7,020,482 B2 | 3/2006 | Medvedev et al. |
| 7,058,367 B1 | 6/2006 | Luo et al. |
| 7,187,949 B2 | 3/2007 | Chang et al. |
| 7,206,294 B2 | 4/2007 | Garahi et al. |
| 7,248,217 B2 | 7/2007 | Mani et al. |
| 7,248,841 B2 | 7/2007 | Agee et al. |
| 7,260,141 B2 | 8/2007 | Bierly et al. |
| 7,333,455 B1 | 2/2008 | Bolt et al. |
| 7,339,979 B1 | 3/2008 | Kelkar |
| 7,363,058 B2 | 4/2008 | Gustaf |
| 7,424,225 B1 | 9/2008 | Elliott |
| 7,574,236 B1 | 8/2009 | Mansour |
| 7,636,573 B2 | 12/2009 | Walton et al. |
| 7,688,909 B2 | 3/2010 | Tsutsui |
| 7,689,216 B2 | 3/2010 | Wandel |
| 7,710,319 B2 | 5/2010 | Nassiri-Toussi et al. |
| 7,890,114 B2 | 2/2011 | Braun et al. |
| 7,904,117 B2 | 3/2011 | Doan et al. |
| 7,911,985 B2 | 3/2011 | Proctor, Jr. et al. |
| 7,920,889 B2 | 4/2011 | Hoshino et al. |
| 7,986,742 B2 | 7/2011 | Ketchum et al. |
| 8,014,366 B2 | 9/2011 | Wax et al. |
| 8,098,752 B2 | 1/2012 | Hwang et al. |
| 8,121,235 B1 | 2/2012 | Sun et al. |
| 8,126,408 B2 | 2/2012 | Ahrony et al. |
| 8,140,122 B2 | 3/2012 | Park et al. |
| 8,160,601 B2 | 4/2012 | Veselinovic et al. |
| 8,175,184 B2 | 5/2012 | Kim et al. |
| 8,190,102 B2 | 5/2012 | Rofougaran |
| 8,203,978 B2 | 6/2012 | Rodney et al. |
| 8,228,188 B2 | 7/2012 | Key et al. |
| 8,279,132 B2 | 10/2012 | Jung et al. |
| 8,280,445 B2 | 10/2012 | Yong et al. |
| 8,314,736 B2 | 11/2012 | Moshfeghi |
| 8,320,304 B2 | 11/2012 | Deb et al. |
| 8,364,188 B2 | 1/2013 | Deb et al. |
| 8,369,791 B2 | 2/2013 | Hafeez |
| 8,385,305 B1 | 2/2013 | Negus et al. |
| 8,385,452 B2 | 2/2013 | Gorokhov |
| 8,396,157 B2 | 3/2013 | Li et al. |
| 8,457,798 B2 | 6/2013 | Hackett |
| 8,462,047 B1 | 6/2013 | Ai et al. |
| 8,482,462 B2 | 7/2013 | Komijani et al. |
| 8,570,988 B2 | 10/2013 | Wallace et al. |
| 8,588,193 B1 | 11/2013 | Ho et al. |
| 8,620,301 B1 | 12/2013 | Hessel |
| 8,644,262 B1 | 2/2014 | Sun et al. |
| 8,654,815 B1 | 2/2014 | Forenza et al. |
| 8,744,513 B2 | 6/2014 | Chen et al. |
| 8,750,264 B2 | 6/2014 | Shatti |
| 8,780,943 B2 | 7/2014 | Moshfeghi |
| 8,787,469 B2 | 7/2014 | Kim et al. |
| 8,817,678 B2 | 8/2014 | Moshfeghi |
| 8,854,255 B1 | 10/2014 | Ehret |
| 8,885,628 B2 | 11/2014 | Palanki et al. |
| 9,037,094 B2 | 5/2015 | Moshfeghi |
| 9,065,515 B2 | 6/2015 | Pezennec et al. |
| 9,112,648 B2 | 8/2015 | Moshfeghi |
| 9,185,601 B2 | 11/2015 | Frerking et al. |
| 9,197,982 B2 | 11/2015 | Moshfeghi |
| 9,225,482 B2 | 12/2015 | Moshfeghi |
| 9,226,092 B2 | 12/2015 | Moshfeghi |
| 9,252,908 B1 | 2/2016 | Branlund |
| 9,253,587 B2 | 2/2016 | Moshfeghi |
| 9,438,389 B2 | 9/2016 | Moshfeghi et al. |
| 9,456,354 B2 | 9/2016 | Branlund |
| 9,548,805 B2 | 1/2017 | Moshfeghi et al. |
| 9,602,257 B2 | 3/2017 | Moshfeghi et al. |
| 9,660,777 B2 | 5/2017 | Moshfeghi et al. |
| 9,680,554 B2 | 6/2017 | Moshfeghi et al. |
| 9,686,060 B2 | 6/2017 | Moshfeghi |
| 9,698,948 B2 | 7/2017 | Moshfeghi |
| 9,736,637 B2 | 8/2017 | Larsen et al. |

(56) References Cited

U.S. PATENT DOCUMENTS

| | | |
|---|---|---|
| 9,780,928 B2 | 10/2017 | Moshfeghi et al. |
| 9,787,103 B1 | 10/2017 | Leabman et al. |
| 9,829,563 B2 | 11/2017 | Xiao et al. |
| 9,923,620 B2 | 3/2018 | Moshfeghi et al. |
| 10,020,861 B2 | 7/2018 | Moshfeghi et al. |
| 10,069,555 B2 | 9/2018 | Islam et al. |
| 10,069,608 B2 | 9/2018 | Moshfeghi et al. |
| 10,084,576 B2 | 9/2018 | Moshfeghi et al. |
| 10,090,887 B1 | 10/2018 | Rofougaran et al. |
| 10,103,853 B2 * | 10/2018 | Moshfeghi ............. H04B 7/043 |
| 10,199,717 B2 | 2/2019 | Rofougaran et al. |
| 10,277,370 B2 * | 4/2019 | Moshfeghi ......... H04W 72/085 |
| 10,320,090 B2 | 6/2019 | Zou et al. |
| 10,348,371 B2 | 7/2019 | Rofougaran et al. |
| 10,560,179 B2 | 2/2020 | Gharavi et al. |
| 10,587,313 B2 | 3/2020 | Yoon et al. |
| 10,666,326 B2 | 5/2020 | Rofougaran et al. |
| 2002/0034958 A1 | 3/2002 | Oberschmidt et al. |
| 2002/0132600 A1 | 9/2002 | Rudrapatna |
| 2002/0193074 A1 | 12/2002 | Squibbs |
| 2002/0196186 A1 | 12/2002 | Holt |
| 2003/0012208 A1 | 1/2003 | Bernheim et al. |
| 2003/0090418 A1 | 5/2003 | Howell |
| 2003/0125040 A1 | 7/2003 | Walton et al. |
| 2003/0129989 A1 | 7/2003 | Gholmieh et al. |
| 2003/0236109 A1 | 12/2003 | Nagata |
| 2004/0077354 A1 | 4/2004 | Jason et al. |
| 2004/0077379 A1 | 4/2004 | Smith et al. |
| 2004/0082356 A1 * | 4/2004 | Walton ................ H04B 7/0669 455/522 |
| 2004/0095907 A1 | 5/2004 | Agee et al. |
| 2004/0110469 A1 | 6/2004 | Judd et al. |
| 2004/0116129 A1 | 6/2004 | Wilson |
| 2004/0127174 A1 | 7/2004 | Frank et al. |
| 2004/0166808 A1 | 8/2004 | Hasegawa et al. |
| 2004/0204114 A1 | 10/2004 | Brennan et al. |
| 2005/0048964 A1 | 3/2005 | Cohen et al. |
| 2005/0069252 A1 | 3/2005 | Hwang et al. |
| 2005/0088358 A1 | 4/2005 | Larry et al. |
| 2005/0134517 A1 | 6/2005 | Gottl |
| 2005/0136943 A1 | 6/2005 | Banerjee et al. |
| 2005/0181755 A1 | 8/2005 | Hoshino et al. |
| 2005/0232216 A1 | 10/2005 | Webster et al. |
| 2005/0237971 A1 | 10/2005 | Skraparlis |
| 2005/0243756 A1 | 11/2005 | Cleveland et al. |
| 2005/0270227 A1 | 12/2005 | Stephens |
| 2006/0025178 A1 | 2/2006 | Tao et al. |
| 2006/0063494 A1 | 3/2006 | Zhang et al. |
| 2006/0121946 A1 | 6/2006 | Walton et al. |
| 2006/0246922 A1 | 11/2006 | Gasbarro et al. |
| 2006/0267839 A1 | 11/2006 | Vaskelainen et al. |
| 2007/0001924 A1 | 1/2007 | Hirabayashi |
| 2007/0040025 A1 | 2/2007 | Goel et al. |
| 2007/0052519 A1 | 3/2007 | Talty et al. |
| 2007/0066254 A1 | 3/2007 | Tsuchie et al. |
| 2007/0093270 A1 | 4/2007 | Lagnado |
| 2007/0100548 A1 | 5/2007 | Small |
| 2007/0115800 A1 | 5/2007 | Fonseka et al. |
| 2007/0116012 A1 | 5/2007 | Chang et al. |
| 2007/0127360 A1 | 6/2007 | Song et al. |
| 2007/0160014 A1 * | 7/2007 | Larsson ................ H04B 7/022 370/338 |
| 2007/0280310 A1 | 12/2007 | Muenter et al. |
| 2008/0025208 A1 | 1/2008 | Chan |
| 2008/0026763 A1 | 1/2008 | Rensburg et al. |
| 2008/0076370 A1 | 3/2008 | Kotecha et al. |
| 2008/0117961 A1 | 5/2008 | Han et al. |
| 2008/0166975 A1 | 7/2008 | Kim et al. |
| 2008/0167049 A1 | 7/2008 | Karr et al. |
| 2008/0212582 A1 | 9/2008 | Zwart et al. |
| 2008/0225758 A1 | 9/2008 | Proctor et al. |
| 2008/0258993 A1 | 10/2008 | Gummalla et al. |
| 2008/0261509 A1 | 10/2008 | Sen |
| 2008/0303701 A1 | 12/2008 | Zhang et al. |
| 2008/0305820 A1 | 12/2008 | Sadiq et al. |
| 2008/0309555 A1 | 12/2008 | Fan et al. |
| 2008/0315944 A1 | 12/2008 | Brown |
| 2009/0009392 A1 | 1/2009 | Jacomb-Hood et al. |
| 2009/0010215 A1 * | 1/2009 | Kim, II ............... H04W 72/085 370/329 |
| 2009/0028120 A1 | 1/2009 | Lee |
| 2009/0029645 A1 | 1/2009 | Leroudier |
| 2009/0093265 A1 | 4/2009 | Kimura et al. |
| 2009/0136227 A1 | 5/2009 | Lambert |
| 2009/0156227 A1 * | 6/2009 | Frerking ............. H04B 7/0877 455/455 |
| 2009/0161235 A1 | 6/2009 | Border et al. |
| 2009/0175214 A1 | 7/2009 | Sfar et al. |
| 2009/0195455 A1 | 8/2009 | Kim et al. |
| 2009/0224137 A1 | 9/2009 | Hoermann |
| 2009/0233545 A1 | 9/2009 | Sutskover et al. |
| 2009/0296846 A1 | 12/2009 | Maru |
| 2009/0325479 A1 | 12/2009 | Chakrabarti et al. |
| 2010/0042881 A1 | 2/2010 | Wong |
| 2010/0046655 A1 | 2/2010 | Lee et al. |
| 2010/0080197 A1 | 4/2010 | Kanellakis et al. |
| 2010/0090898 A1 | 4/2010 | Gallagher et al. |
| 2010/0105403 A1 | 4/2010 | Lennartson et al. |
| 2010/0117890 A1 | 5/2010 | Vook et al. |
| 2010/0124895 A1 | 5/2010 | Martin et al. |
| 2010/0136922 A1 * | 6/2010 | Rofougaran ......... H04B 7/0871 455/73 |
| 2010/0149039 A1 | 6/2010 | Komijani et al. |
| 2010/0167639 A1 | 7/2010 | Ranson et al. |
| 2010/0172309 A1 | 7/2010 | Forenza et al. |
| 2010/0208776 A1 | 8/2010 | Song et al. |
| 2010/0220012 A1 | 9/2010 | Reede |
| 2010/0265925 A1 | 10/2010 | Liu et al. |
| 2010/0266061 A1 | 10/2010 | Cheng et al. |
| 2010/0267415 A1 | 10/2010 | Kakitsu et al. |
| 2010/0273504 A1 | 10/2010 | Bull et al. |
| 2010/0284446 A1 | 11/2010 | Mu et al. |
| 2010/0291918 A1 | 11/2010 | Suzuki et al. |
| 2010/0304680 A1 | 12/2010 | Kuffner et al. |
| 2010/0304770 A1 | 12/2010 | Wietfeldt et al. |
| 2010/0328157 A1 | 12/2010 | Culkin et al. |
| 2011/0002410 A1 | 1/2011 | Forenza et al. |
| 2011/0003610 A1 | 1/2011 | Key et al. |
| 2011/0045764 A1 | 2/2011 | Maruyama et al. |
| 2011/0063181 A1 | 3/2011 | Walker |
| 2011/0069773 A1 | 3/2011 | Doron et al. |
| 2011/0081875 A1 | 4/2011 | Imamura et al. |
| 2011/0105032 A1 | 5/2011 | Maruhashi et al. |
| 2011/0105167 A1 | 5/2011 | Pan et al. |
| 2011/0136478 A1 | 6/2011 | Trigui |
| 2011/0140954 A1 | 6/2011 | Fortuny-Guasch |
| 2011/0142104 A1 * | 6/2011 | Coldrey ................ H04B 7/1555 375/211 |
| 2011/0149835 A1 * | 6/2011 | Shimada ................ H04B 7/024 370/315 |
| 2011/0164510 A1 | 7/2011 | Zheng et al. |
| 2011/0190005 A1 | 8/2011 | Cheon et al. |
| 2011/0194504 A1 | 8/2011 | Gorokhov et al. |
| 2011/0212684 A1 | 9/2011 | Nam et al. |
| 2011/0222616 A1 | 9/2011 | Jiang et al. |
| 2011/0268037 A1 | 11/2011 | Fujimoto |
| 2011/0299441 A1 | 12/2011 | Petrovic et al. |
| 2012/0002742 A1 | 1/2012 | Cheng |
| 2012/0015603 A1 | 1/2012 | Proctor et al. |
| 2012/0034924 A1 | 2/2012 | Kalhan |
| 2012/0057508 A1 | 3/2012 | Moshfeghi |
| 2012/0082070 A1 | 4/2012 | Hart et al. |
| 2012/0082072 A1 | 4/2012 | Shen |
| 2012/0083207 A1 | 4/2012 | Rofougaran et al. |
| 2012/0083223 A1 | 4/2012 | Li et al. |
| 2012/0083225 A1 | 4/2012 | Rofougaran et al. |
| 2012/0083233 A1 | 4/2012 | Rofougaran et al. |
| 2012/0083306 A1 | 4/2012 | Rofougaran et al. |
| 2012/0093209 A1 | 4/2012 | Schmidt et al. |
| 2012/0120884 A1 | 5/2012 | Yu et al. |
| 2012/0129543 A1 | 5/2012 | Patel et al. |
| 2012/0131650 A1 | 5/2012 | Gutt et al. |
| 2012/0149300 A1 * | 6/2012 | Forster ............. H04W 52/0229 455/11.1 |

(56) References Cited

U.S. PATENT DOCUMENTS

| | | |
|---|---|---|
| 2012/0184203 A1 | 7/2012 | Tulino et al. |
| 2012/0184219 A1 | 7/2012 | Richardson et al. |
| 2012/0194385 A1 | 8/2012 | Schmidt et al. |
| 2012/0206299 A1 | 8/2012 | Valdes-Garcia |
| 2012/0224651 A1 | 9/2012 | Murakami et al. |
| 2012/0230274 A1 | 9/2012 | Xiao et al. |
| 2012/0238202 A1 | 9/2012 | Kim et al. |
| 2012/0250659 A1 | 10/2012 | Sambhwani |
| 2012/0257516 A1 | 10/2012 | Pazhyannur et al. |
| 2012/0259547 A1 | 10/2012 | Morlock et al. |
| 2012/0314570 A1 | 12/2012 | Forenza et al. |
| 2013/0027240 A1 | 1/2013 | Chowdhury |
| 2013/0027250 A1 | 1/2013 | Chen |
| 2013/0039342 A1 | 2/2013 | Kazmi |
| 2013/0040558 A1 | 2/2013 | Kazmi |
| 2013/0044028 A1 | 2/2013 | Lea et al. |
| 2013/0057447 A1 | 3/2013 | Pivit et al. |
| 2013/0089123 A1 | 4/2013 | Rahul et al. |
| 2013/0094439 A1 | 4/2013 | Moshfeghi |
| 2013/0094440 A1 | 4/2013 | Moshfeghi |
| 2013/0094522 A1 | 4/2013 | Moshfeghi |
| 2013/0094544 A1 | 4/2013 | Moshfeghi |
| 2013/0095747 A1 | 4/2013 | Moshfeghi |
| 2013/0095770 A1 | 4/2013 | Moshfeghi |
| 2013/0095874 A1 | 4/2013 | Moshfeghi et al. |
| 2013/0114468 A1 | 5/2013 | Hui et al. |
| 2013/0155891 A1 | 6/2013 | Dinan |
| 2013/0272220 A1 | 10/2013 | Li et al. |
| 2013/0272437 A1 | 10/2013 | Eidson et al. |
| 2013/0286962 A1 | 10/2013 | Heath, Jr. et al. |
| 2013/0287139 A1 | 10/2013 | Zhu et al. |
| 2013/0322561 A1 | 12/2013 | Abreu et al. |
| 2013/0324055 A1 | 12/2013 | Kludt et al. |
| 2013/0343235 A1 | 12/2013 | Khan |
| 2014/0003338 A1 | 1/2014 | Rahul et al. |
| 2014/0010319 A1 | 1/2014 | Baik et al. |
| 2014/0016573 A1 | 1/2014 | Nuggehalli et al. |
| 2014/0035731 A1 | 2/2014 | Chan et al. |
| 2014/0044041 A1 | 2/2014 | Moshfeghi |
| 2014/0044042 A1 | 2/2014 | Moshfeghi |
| 2014/0044043 A1 | 2/2014 | Moshfeghi et al. |
| 2014/0045478 A1 | 2/2014 | Moshfeghi |
| 2014/0045541 A1 | 2/2014 | Moshfeghi et al. |
| 2014/0072078 A1 | 3/2014 | Sergeyev et al. |
| 2014/0079165 A1 | 3/2014 | Kludt et al. |
| 2014/0086191 A1 | 3/2014 | Berntsen et al. |
| 2014/0104124 A1 | 4/2014 | Chernokalov et al. |
| 2014/0125539 A1 | 5/2014 | Katipally et al. |
| 2014/0133435 A1 | 5/2014 | Forenza et al. |
| 2014/0161018 A1 | 6/2014 | Chang et al. |
| 2014/0198696 A1 | 7/2014 | Li et al. |
| 2014/0241296 A1 | 8/2014 | Shattil |
| 2014/0266866 A1 | 9/2014 | Swirhun et al. |
| 2015/0003307 A1 | 1/2015 | Moshfeghi et al. |
| 2015/0011160 A1 | 1/2015 | Jurgovan et al. |
| 2015/0031407 A1 | 1/2015 | Moshfeghi |
| 2015/0042744 A1 | 2/2015 | Ralston et al. |
| 2015/0091706 A1 | 4/2015 | Chemishkian et al. |
| 2015/0123496 A1 | 5/2015 | Leabman et al. |
| 2015/0229133 A1 | 8/2015 | Reynolds et al. |
| 2015/0241020 A1 | 8/2015 | Lee et al. |
| 2015/0296344 A1 | 10/2015 | Trojer et al. |
| 2015/0303950 A1 | 10/2015 | Shattil |
| 2015/0318897 A1 | 11/2015 | Hyde et al. |
| 2015/0318905 A1 | 11/2015 | Moshfeghi et al. |
| 2015/0341098 A1 | 11/2015 | Angeletti et al. |
| 2016/0014613 A1 | 1/2016 | Ponnampalam et al. |
| 2016/0043838 A1 | 2/2016 | Moshfeghi |
| 2016/0054440 A1 | 2/2016 | Younis |
| 2016/0094092 A1 | 3/2016 | Davlantes et al. |
| 2016/0094318 A1 | 3/2016 | Shattil |
| 2016/0142114 A1 | 5/2016 | Moshfeghi |
| 2016/0192400 A1 | 6/2016 | Sohn et al. |
| 2016/0197665 A1 | 7/2016 | Moshfeghi |
| 2016/0203347 A1 | 7/2016 | Bartholomew et al. |
| 2016/0211905 A1 | 7/2016 | Moshfeghi et al. |
| 2016/0219567 A1 | 7/2016 | Gil et al. |
| 2016/0285481 A1 | 9/2016 | Cohen |
| 2017/0026218 A1 | 1/2017 | Shattil |
| 2017/0062944 A1 | 3/2017 | Zimmerman et al. |
| 2017/0078897 A1 | 3/2017 | Duan et al. |
| 2017/0126374 A1 | 5/2017 | Moshfeghi et al. |
| 2017/0156069 A1 | 6/2017 | Moshfeghi et al. |
| 2017/0201437 A1 | 7/2017 | Balakrishnan et al. |
| 2017/0212208 A1 | 7/2017 | Baek et al. |
| 2017/0230099 A1 | 8/2017 | Moshfeghi et al. |
| 2017/0237290 A1 | 8/2017 | Bakker et al. |
| 2017/0257155 A1 | 9/2017 | Liang et al. |
| 2017/0264014 A1 | 9/2017 | Le-Ngoc |
| 2017/0279573 A1 | 9/2017 | Moshfeghi et al. |
| 2017/0288727 A1 | 10/2017 | Rappaport |
| 2017/0317734 A1 | 11/2017 | Moshfeghi |
| 2017/0317801 A1 | 11/2017 | Moshfeghi et al. |
| 2017/0324480 A1 | 11/2017 | Elmirghani et al. |
| 2017/0332249 A1 | 11/2017 | Guey et al. |
| 2017/0338921 A1 | 11/2017 | Moshfeghi |
| 2017/0339625 A1 | 11/2017 | Stapleton |
| 2017/0353338 A1 | 12/2017 | Amadjikpe et al. |
| 2018/0026586 A1 | 1/2018 | Carbone et al. |
| 2018/0041270 A1 | 2/2018 | Buer et al. |
| 2018/0048390 A1 | 2/2018 | Palmer et al. |
| 2018/0063139 A1 | 3/2018 | Day et al. |
| 2018/0090992 A1 | 3/2018 | Shrivastava et al. |
| 2018/0091270 A1 | 3/2018 | Moshfeghi |
| 2018/0109303 A1 | 4/2018 | Yoo et al. |
| 2018/0115305 A1 | 4/2018 | Islam et al. |
| 2018/0176799 A1 | 6/2018 | Lange et al. |
| 2018/0183152 A1 | 6/2018 | Turpin et al. |
| 2018/0220416 A1 | 8/2018 | Islam et al. |
| 2018/0234158 A1 | 8/2018 | Moshfeghi |
| 2019/0089434 A1 | 3/2019 | Rainish et al. |
| 2019/0123866 A1 | 4/2019 | Moshfeghi |
| 2019/0230626 A1 | 7/2019 | Rune et al. |
| 2019/0319754 A1* | 10/2019 | Moshfeghi ............ H04B 7/0689 |
| 2019/0319755 A1* | 10/2019 | Moshfeghi ............ H04B 7/0408 |
| 2019/0319756 A1* | 10/2019 | Moshfeghi ............ H04B 7/0408 |
| 2020/0076491 A1 | 3/2020 | Zhang et al. |
| 2020/0145079 A1 | 5/2020 | Marinier et al. |

FOREIGN PATENT DOCUMENTS

| | | |
|---|---|---|
| WO | 2008027531 A2 | 3/2008 |
| WO | 2012055468 A1 | 5/2012 |
| WO | 2013058998 A2 | 4/2013 |
| WO | 2013058999 A2 | 4/2013 |
| WO | 2016115545 A2 | 7/2016 |
| WO | 2016115545 A3 | 10/2016 |

OTHER PUBLICATIONS

Corrected Notice of Allowance for U.S. Appl. No. 16/382,386 dated Dec. 30, 2019.
Corrected Notice of Allowance for U.S. Appl. No. 15/616,911 dated Jan. 24, 2020.
Corrected Notice of Allowance for U.S. Appl. No. 15/904,521 dated Jan. 8, 2020.
Corrected Notice of Allowance for U.S. Appl. No. 15/904,521 dated Mar. 12, 2020.
Corrected Notice of Allowance for U.S. Appl. No. 16/032,617 dated Jan. 9, 2020.
Corrected Notice of Allowance for U.S. Appl. No. 16/032,668 dated Dec. 30, 2019.
Corrected Notice of Allowance for U.S. Appl. No. 16/032,668 dated Mar. 23, 2020.
Corrected Notice of Allowance for U.S. Appl. No. 16/129,423 dated Jan. 23, 2020.
Corrected Notice of Allowance for U.S. Appl. No. 16/382,386 dated Feb. 6, 2020.
Final Office Action for U.S. Appl. No. 16/377,980 dated Mar. 4, 2020.
Final Office Action for U.S. Appl. No. 16/526,544 dated Feb. 12, 2020.

(56) References Cited

OTHER PUBLICATIONS

Non-Final Office Action for U.S. Appl. No. 16/125,757 dated Mar. 23, 2020.
Non-Final Office Action for U.S. Appl. No. 16/129,413 dated Feb. 12, 2020.
Non-Final Office Action for U.S. Appl. No. 16/388,043 dated Dec. 27, 2019.
Non-Final Office Action for U.S. Appl. No. 16/666,680 dated Feb. 19, 2020.
Notice of Allowance for U.S. Appl. No. 16/231,903 dated Mar. 24, 2020.
Notice of Allowance for U.S. Appl. No. 16/294,025 dated Jan. 13, 2020.
Supplemental Notice of Allowance for U.S. Appl. No. 16/032,668 dated Feb. 14, 2020.
Supplemental Notice of Allowance for U.S. Appl. No. 16/129,423 dated Mar. 3, 2020.
Supplemental Notice of Allowance for U.S. Appl. No. 16/294,025 dated Mar. 25, 2020.
Notice of Allowance in U.S. Appl. No. 15/835,971 dated May 29, 2018.
Notice of Allowance in U.S. Appl. No. 15/904,521 dated Mar. 20, 2019.
Notice of Allowance issued in U.S. Appl. No. 16/129,423 dated Jul. 15, 2019.
Patent Board Decision—Examiner Affirmed for U.S. Appl. No. 13/473,144 dated Jun. 4, 2018.
Patent Board Decision—Examiner Affirmed in Part for U.S. Appl. No. 13/473,160 dated Feb. 21, 2017.
Patent Board Decision—Examiner Reversed for U.S. Appl. No. 13/919,932 dated Dec. 19, 2017.
Response to Rule 312 Communication for U.S. Appl. No. 15/834,894 dated Apr. 19, 2019; Miscellaneous Communication to Applicant for U.S. Appl. No. 15/834,894 dated Apr. 19, 2019.
Restriction Requirement for U.S. Appl. No. 15/893,626 dated Aug. 12, 2016.
Shimin Gong et al., "Backscatter Relay Communications Powered by Wireless Energy Beamforming," IEEE Trans. on Communication, 2018.
USPTO Miscellaneous communication for U.S. Appl. No. 15/834,894 dated Apr. 19, 2019.
Zeng et al., "Joint relay selection and beamforming for mmWave fronthauling network," 2017 IEEE/CIC International Conference on Communications in China, Oct. 22, 2017, 6 pages.
Non-Final Office Action for U.S. Appl. No. 16/016,619 dated Sep. 25, 2018.
Baggett, Benjamin M.W. Optimization of Aperiodically Spaced Phased Arrays for Wideband Applications. MS Thesis. Virginia Polytechnic Institute and State University, 2011. pp. 1-137.
Corrected Notice of Allowability for U.S. Appl. No. 15/904,521 dated May 6, 2019.
Corrected Notice of Allowance for U.S. Appl. No. 16/031,007 dated Jul. 8, 2019.
Corrected Notice of Allowance for U.S. Appl. No. 15/607,743 dated May 10, 2019.
Corrected Notice of Allowance for U.S. Appl. No. 15/904,521 dated Jun. 21, 2019.
Corrected Notice of Allowance for U.S. Appl. No. 15/904,521 dated May 10, 2019.
Corrected Notice of Allowance for U.S. Appl. No. 13/473,180 dated Jun. 11, 2014.
Corrected Notice of Allowance for U.S. Appl. No. 15/904,521.
Corrected Notice of Allowance for U.S. Appl. No. 16/031,007 dated Aug. 5, 2019.
Corrected Notice of Allowance in U.S. Appl. No. 15/607,743 dated Apr. 3, 2019.
Corrected Notice of Allowance in U.S. Appl. No. 15/835,971 dated Jul 23, 2018.
Dennis R Morgan et al., "A same-frequency cellular repeater using adaptive feedback cancellation," Global Communications Conference (GLOBECOM), 2012 IEEE, IEEE, (2012) XP032375270, pp. 3825-3830, 2012.
Ex Parte Quayle Action for U.S. Appl. No. 16/032,668 dated Jul. 10, 2019.
Examiner's Answer to Appeal Brief for U.S. Appl. No. 13/473,144 dated Jul. 26, 2017.
Examiner's Answer to Appeal Brief for U.S. Appl. No. 13/473,160 dated Dec. 24, 2015.
Examiner's Answer to Appeal Brief for U.S. Appl. No. 13/919,932 dated Jan. 10, 2017.
Final Office Action for U.S. Appl. No. 13/473,144 dated Jul. 28, 2016.
Final Office Action for U.S. Appl. No. 13/473/144 dated Aug. 14, 2014.
Final Office Action for U.S. Appl. No. 13/919,932 dated Oct. 23, 2015.
Final Office Action for U.S. Appl. No. 13/919,972 dated Jan. 21, 2016.
Final Office Action for U.S. Appl. No. 14/940,130 dated Oct. 14, 2016.
Final Office Action for U.S. Appl. No. 16/129,413 dated Aug. 13, 2019.
Final Office Action for U.S. Appl. No. dated Oct. 22, 2014.
International Preliminary Report on Patentability for International Patent PCT/US2012/058839, 5 pages, dated Apr. 22, 2014.
International Preliminary Report on Patentability for International Patent PCT/US2012/058839, dated Apr. 22, 2014.
International Preliminary Report on Patentability for International Patent PCT/US2012/058842, 5 pages, dated Apr. 22, 2014.
International Search Report and the Written Opinion of the International Searching Authority in International application No. PCT/US12/58842, 6 pages, dated Jan. 42013.
International Search Report and the Written Opinion of the International Searching Authority in International application No. PCT/US12/58839, 6 pages, dated Apr. 4, 2013.
International Search Report in PCT/US2018/064184 dated Jul. 1, 2019.
Invitation to Pay Additional Fees and, Where Applicable, Protest Fee, with Partial Search Report for PCT Appl No. PCT/US2018/064184 dated Apr. 10, 2019.
K. Han and K. Huang, "Wirelessly Powered Backscatter Communication networks: Modeling, Coverage and Capacity," Apr. 9, 2016, Arxiv.com.
List of References cited by Applicant and considered by Applicant for U.S. Appl. No. 14/325,218 dated Apr. 21, 2017.
Non-Final Office Action for U.S. Appl. No. 13/473,083 dated Mar. 3, 2014.
Non-Final Office Action for U.S. Appl. No. 13/473,096 dated Apr. 23, 2014.
Non-Final Office Action for U.S. Appl. No. 13/473,096 dated Dec. 9, 2013.
Non-Final Office Action for U.S. Appl. No. 13/473,096 dated Nov. 3, 2014.
Non-Final Office Action for U.S. Appl. No. 13/473,105 dated Nov. 25, 2013.
Non-Final Office Action for U.S. Appl. No. 13/473,113 dated Oct. 2, 2014.
Non-Final Office Action for U.S. Appl. No. 13/473,144 dated Feb. 6, 2014.
Non-Final Office Action for U.S. Appl. No. 13/473,144 dated Feb. 9, 2015.
Non-Final Office Action for U.S. Appl. No. 13/473,144 dated Oct. 7, 2015.
Non-Final Office Action for U.S. Appl. No. 13/473,160 dated Jan. 15, 2014.
Non-Final Office Action for U.S. Appl. No. 13/473,180 dated Sep. 12, 2013.
Non-Final Office Action for U.S. Appl. No. 13/919,922 dated Jan. 30, 2015.
Non-Final Office Action for U.S. Appl. No. 13/919,932 dated Feb. 6, 2015.

(56) References Cited

OTHER PUBLICATIONS

Non-Final Office Action for U.S. Appl. No. 13/919,958 dated Jan. 5, 2015.
Non-Final Office Action for U.S. Appl. No. 13/919,967 dated Feb. 9, 2015.
Non-Final Office Action for U.S. Appl. No. 13/919,972 dated Jun. 4, 2015.
Non-Final Office Action for U.S. Appl. No. 14/455,859 dated Nov. 13, 2015.
Non-Final Office Action for U.S. Appl. No. 14/709,136 dated Sep. 28, 2016.
Non-Final Office Action for U.S. Appl. No. 14/813,058 dated Jun. 10, 2016.
Non-Final Office Action for U.S. Appl. No. 14/940,130 dated Apr. 6, 2016.
Non-Final Office Action for U.S. Appl. No. 14/980,281 dated Apr. 20, 2016.
Non-Final Office Action for U.S. Appl. No. 14/980,338 dated Mar. 14, 2017.
Non-Final Office Action for U.S. Appl. No. 15/229,135 dated Dec. 21, 2017.
Non-Final Office Action for U.S. Appl. No. 15/372,417 dated May 3, 2018.
Non-Final Office Action for U.S. Appl. No. 15/441,209 dated Jul. 3, 2018.
Non-Final Office Action for U.S. Appl. No. 15/595,940 dated Nov. 17, 2017.
Non-Final Office Action for U.S. Appl. No. 15/616,911 dated Jan. 3, 2019.
Non-Final Office Action for U.S. Appl. No. 15/706,759 dated Jun. 12, 2018.
Non-Final Office Action for U.S. Appl. No. 15/893,626 dated Jun. 12, 2018.
Non-Final Office Action for U.S. Appl. No. 16/101,044 dated Dec. 26, 2018.
Non-Final Office Action for U.S. Appl. No. 16/125,757 dated Aug. 9, 2019.
Non-Final Office Action for U.S. Appl. No. 16/129,413 dated Feb. 4, 2019.
Non-Final Office Action for U.S. Appl. No. 16/129,423 dated Feb. 4, 2019.
Non-Final Office Action for U.S. Appl. No. 16/377,980 dated Aug. 21, 2019.
Non-Final Office Action in U.S. Appl. No. 15/432,091 dated Nov. 22, 2017.
Non-Final Office Action in U.S. Appl. No. 16/111,326 dated Mar. 1, 2019.
Notice of Allowance for U.S. Appl. No. 13/473,083 dated Jan. 7, 2015.
Notice of Allowance for U.S. Appl. No. 13/473,096 dated Apr. 17, 2015.
Notice of Allowance for U.S. Appl. No. 13/473,105 dated Jun. 10, 2014.
Notice of Allowance for U.S. Appl. No. 13/473,113 dated Aug. 10, 2015.
Notice of Allowance for U.S. Appl. No. 13/473,160 dated May 25, 2017.
Notice of Allowance for U.S. Appl. No. 13/473,180 dated May 1, 2014.
Notice of Allowance for U.S. Appl. No. 13/919,922 dated Oct. 27, 2015.
Notice of Allowance for U.S. Appl. No. 13/919,932 dated Feb. 28, 2018.
Notice of Allowance for U.S. Appl. No. 13/919,958 dated Sep. 2, 2015.
Notice of Allowance for U.S. Appl. No. 13/919,967 dated Jul. 29, 2019.
Notice of Allowance for U.S. Appl. No. 13/919,972 dated Dec. 20, 2016.
Notice of Allowance for U.S. Appl. No. 14/325,218 dated Dec. 19, 2016.
Notice of Allowance for U.S. Appl. No. 14/455,859 dated Apr. 20, 2016.
Notice of Allowance for U.S. Appl. No. 14/709,136 dated Feb. 16, 2017.
Notice of Allowance for U.S. Appl. No. 14/813,058 dated Nov. 7, 2016.
Notice of Allowance for U.S. Appl. No. 14/940,130 dated Feb. 1, 2017.
Notice of Allowance for U.S. Appl. No. 14/980,281 dated Feb. 7, 2017.
Notice of Allowance for U.S. Appl. No. 14/980,338 dated Feb. 22, 2018.
Notice of Allowance for U.S. Appl. No. 15/229,135 dated May 22, 2018.
Notice of Allowance for U.S. Appl. No. 15/372,417 dated Dec. 7, 2018.
Notice of Allowance for U.S. Appl. No. 15/441,209 dated Dec. 28, 2018.
Notice of Allowance for U.S. Appl. No. 15/472,148 dated Dec. 10, 2018.
Notice of Allowance for U.S. Appl. No. 15/595,919 dated Jun. 5, 2019.
Notice of Allowance for U.S. Appl. No. 15/595,940 dated May 1, 2018.
Notice of Allowance for U.S. Appl. No. 15/616,911 dated Jul. 24, 2019.
Notice of Allowance for U.S. Appl. No. 16/129,423 dated Jul. 15, 2019.
Notice of Allowance for U.S. Appl. No. 16/382,386 dated Jul. 24, 2019.
Notice of Allowance for U.S. Appl. No. 16/031,007 dated May 2, 2019.
Notice of Allowance in U.S. Appl. No. 15/432,091 dated Apr. 11, 2018.
Notice of Allowance in U.S. Appl. No. 15/607,743 dated Jan. 22, 2019.
Notice of Allowance in U.S. Appl. No. 15/834,894 dated Feb. 20, 2019.
Corrected Notice of Allowance for U.S. Appl. No. 16/031,007 dated Sep. 16, 2019.
Corrected Notice of Allowance for U.S. Appl. No. 15/616,911 dated Oct. 31, 2019.
Corrected Notice of Allowance for U.S. Appl. No. 15/616,911 dated Dec. 12, 2019.
Corrected Notice of Allowance for U.S. Appl. No. 16/031,007 dated Oct. 22, 2019.
Corrected Notice of Allowance for U.S. Appl. No. 16/032,617 dated Oct. 28, 2019.
Corrected Notice of Allowance for U.S. Appl. No. 16/129,423 dated Nov. 7, 2019.
Final Office Action for U.S. Appl. No. 16/125,757 dated Dec. 2, 2019.
Misc Communication from USPTO for U.S. Appl. No. 16/382,386 dated Oct. 8, 2019.
Non-Final Office Action for U.S. Appl. No. 16/231,903 dated Sep. 18, 2019.
Non-Final Office Action for U.S. Appl. No. 16/294,025 dated Sep. 12, 2019.
Non-Final Office Action for U.S. Appl. No. 16/526,544 dated Sep. 18, 2019.
Non-Final Office Action in U.S. Appl. No. 15/836,198 dated Oct. 31, 2019.
Notice of Allowance for U.S. Appl. No. 16/032,668 dated Sep. 20, 2019.
Notice of Allowance for U.S. Appl. No. 15/595,919 dated Oct. 25, 2019.
Notice of Allowance for U.S. Appl. No. 15/904,521 dated Sep. 20, 2019.
Notice of Allowance for U.S. Appl. No. 16/111,326 dated Oct. 10, 2019.

(56) References Cited

OTHER PUBLICATIONS

Notice of Allowance for U.S. Appl. No. 16/129,423 dated Nov. 27, 2019.
Corrected Notice of Allowance for U.S. Appl. No. 16/526,544 dated May 13, 2020.
Corrected Notice of Allowance for U.S. Appl. No. 15/836,198 dated May 22, 2020.
Corrected Notice of Allowance for U.S. Appl. No. 16/111,326 dated Apr. 23, 2020.
Corrected Notice of Allowance for U.S. Appl. No. 16/294,025 dated May 18, 2020.
Supplemental Notice of Allowance for U.S. Appl. No. 16/231,903 dated Apr. 30, 2020.
Final Office Action for U.S. Appl. No. 16/388,043 dated Apr. 15, 2020.
Final Office Action for U.S. Appl. No. 16/666,680 dated Jun. 29, 2020.
Notice of Allowance for U.S. Appl. No. 16/526,544 dated Apr. 9, 2020.
Notice of Allowance for U.S. Appl. No. 16/377,980 dated Apr. 14, 2020.
Non-Final Office Action for U.S. Appl. No. 16/364,956 dated Apr. 10, 2020.
Non-Final Office Action for U.S. Appl. No. 16/377,847 dated Apr. 20, 2020.
Non-Final Office Action for U.S. Appl. No. 16/675,290 dated Apr. 30, 2020.
Non-Final Office Action for U.S. Appl. No. 16/819,388 dated Jul. 2, 2020.
Supplemental Notice of Allowance for U.S. Appl. No. 16/231,903 dated Jul. 1, 2020.
Notice of Allowance for U.S. Appl. No. 15/607,750 dated Jun. 1, 2020.
Notice of Allowance for U.S. Appl. No. 15/836,198 dated Apr. 17, 2020.
Final Office Action for U.S. Appl. No. 15/256,222 dated Oct. 4, 2019.
Non-Final Office Action for U.S. Appl. No. 15/256,222 dated Aug. 27, 2018.
Non-Final Office Action for U.S. Appl. No. 15/256,222 dated Mar. 21, 2019.
Notice of Allowance for U.S. Appl. No. 15/256,222 dated Apr. 3, 2020.
Corrected Notice of Allowability for U.S. Appl. No. 15/256,222 dated Jul. 10, 2020.
Corrected Notice of Allowability for U.S. Appl. No. 16/377,980 dated Jul. 22, 2020.
Corrected Notice of Allowability for U.S. Appl. No. 16/526,544 dated Jul. 16, 2020.
Corrected Notice of Allowance for U.S. Appl. No. 16/526,544 dated Aug. 25, 2020.
Corrected Notice of Allowance for U.S. Appl. No. 16/526,544 dated Sep. 25, 2020.
Final Office Action for U.S. Appl. No. 16/125,757 dated Jul. 15, 2020.
Final Office Action for U.S. Appl. No. 16/377,847 dated Jul. 13, 2020.
Non-Final Office Action for U.S. Appl. No. 16/204,397 dated Sep. 17, 2020.
Non-Final Office Action for U.S. Appl. No. 16/388,043 dated Aug. 3, 2020.
Non-Final Office Action for U.S. Appl. No. 16/451,998 dated Sep. 11, 2020.
Non-Final Office Action for U.S. Appl. No. 16/452,023 dated Sep. 9, 2020.
Non-Final Office Action for U.S. Appl. No. 16/461,980 dated Sep. 21, 2020.
Non-Final Office Action for U.S. Appl. No. 16/866,536 dated Sep. 1, 2020.
Notice of Allowance for U.S. Appl. No. 16/129,413 dated Aug. 12, 2020.
Notice of Allowance for U.S. Appl. No. 16/684,789 dated Jul. 10, 2020.
Supplemental Notice of Allowability for U.S. Appl. No. 16/153,735 dated Jul. 22, 2020.
Non-Final Office Action for U.S. Appl. No. 16/689,758 dated Sep. 29, 2020.
Corrected Notice of Allowance for U.S. Appl. No. 15/256,222 dated Oct. 28, 2020.
Corrected Notice of Allowance for U.S. Appl. No. 15/836,198 dated Oct. 2, 2020.
Corrected Notice of Allowance for U.S. Appl. No. 16/377,980 dated Oct. 5, 2020.
Final Office Action for U.S. Appl. No. 16/364,956 dated Oct. 2, 2020.
Non-Final Office Action for U.S. Appl. No. 16/233,044 dated Oct. 14, 2020.
Non-Final Office Action for U.S. Appl. No. 16/398,156 dated Oct. 15, 2020.
Non-Final Office Action for U.S. Appl. No. 16/666,680 dated Nov. 13, 2020.
Non-Final Office Action for U.S. Appl. No. 16/941,690 dated Nov. 12, 2020.
Notice of Allowability for U.S. Appl. No. 16/129,413 dated Nov. 9, 2020.
Notice of Allowance for U.S. Appl. No. 16/125,757 dated Oct. 28, 2020.
Notice of Allowance for U.S. Appl. No. 16/388,043 dated Nov. 5, 2020.
Notice of Allowance for U.S. Appl. No. 16/927,470 dated Oct. 29, 2020.
Corrected Notice of Allowance for U.S. Appl. No. 16/129,413 dated Nov. 27, 2020.
Corrected Notice of Allowance for U.S. Appl. No. 16/388,043 dated Dec. 24, 2020.
Corrected Notice of Allowance for U.S. Appl. No. 16/675,290 dated Dec. 16, 2020.
Corrected Notice of Allowance for U.S. Appl. No. 16/684,789 dated Nov. 20, 2020.
Non-Final Office Action for U.S. Appl. No. 16/377,847 dated Dec. 14, 2020.
Notice of Allowance for U.S. Appl. No. 16/364,956 dated Dec. 11, 2020.
Notice of Allowance for U.S. Appl. No. 16/452,023 dated Nov. 15, 2020.

\* cited by examiner

METHOD AND SYSTEM FOR A REPEATER NETWORK THAT UTILIZES DISTRIBUTED TRANSCEIVERS WITH ARRAY PROCESSING

CLAIM OF PRIORITY

This patent application is a continuation application of U.S. patent application Ser. No. 15/853,537, filed Dec. 22, 2017, published as U.S. Patent Publication 2018/0139016. U.S. patent application Ser. No. 15/853,537 is a continuation application of U.S. patent application Ser. No. 13/473,144, filed May 16, 2012, published as U.S. Patent Publication 2013/0095747. U.S. patent application Ser. No. 13/473,144, claims priority to and claims benefit from U.S. Provisional Patent Application Ser. No. 61/548,201 filed on Oct. 17, 2011. U.S. patent application Ser. No. 15/853,537, published as U.S. Patent Publication 2018/0139016; U.S. patent application Ser. No. 13/473,144, published as U.S. Patent Publication 2013/0095747; and U.S. Provisional Patent Application 61/548,201 are incorporated herein by reference.

The above stated application is hereby incorporated herein by reference in its entirety.

CROSS-REFERENCE TO RELATED APPLICATIONS/INCORPORATION BY REFERENCE

This application makes reference to:

U.S. application Ser. No. 13/473,096, filed on May 16, 2012, now issued as U.S. Pat. No. 9,112,648;

U.S. application Ser. No. 13/473,105, filed on May 16, 2012, now issued as U.S. Pat. No. 8,817,678;

U.S. application Ser. No. 13/473,160, filed on May 16, 2012, now issued as U.S. Pat. No. 9,780,928;

U.S. application Ser. No. 13/473,180, filed on May 16, 2012, now issued as U.S. Pat. No. 8,780,943;

U.S. application Ser. No. 13/473,113, filed on May 16, 2012, now issued as U.S. Pat. No. 9,225,482; and U.S. application Ser. No. 13/473,083, filed on May 16, 2012, now issued as U.S. Pat. No. 9,037,094.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and a system for a repeater network that utilizes distributed transceivers with array processing.

BACKGROUND OF THE INVENTION

Millimeter Wave (mmWave) devices are being utilized for high throughput wireless communications at very high carrier frequencies. There are several standards bodies such as 60 GHz wireless standard, WirelessHD, WiGig, and WiFi IEEE 802.11ad that utilize high frequencies such as the 60 GHz frequency spectrum for high throughput wireless communications. In the US, the 60 GHz spectrum band may be used for unlicensed short range data links such as, for example, data links within a range of 1.7 km, with data throughputs up to 6 Gbits/s. These higher frequencies may provide smaller wavelengths and enable the use of small high gain antennas. However, these higher frequencies may experience high propagation loss. Other applications may include fixed wireless communications, such as wireless backhaul links between cellular base stations.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a repeater network that utilizes distributed transceivers with array processing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for repeater network that utilizes distributed transceivers with array processing. In various embodiments of the invention, a relay device that comprises a plurality of distributed transceivers, a central processor and a network management engine, may relay an input data stream from a source device to at least one other device. In this regard, the relaying may comprise configuring one or more of the plurality of distributed transceivers to operate in a particular mode of relay operation. The input data stream may be from the source device via at least one of the configured distributed transceivers. At least one relay data stream corresponding to the input data stream may be transmitted to the other device, via at least one of the configured distributed transceivers. The one other device may comprise another relay device, or a destination device for the input data stream. The source device may comprise another relay device or an original source device for the input data stream. The particular mode of relay operation may be determined based on one or more performance criteria, which may pertain to, for example, link quality and/or propagation environment.

The particular mode of relay operation may be selected from a plurality of modes of relay operation. In this regard, the plurality of modes of relay operation may comprise a passive mode of relay operation and an active mode of relay operation. The passive mode of relay operation may comprise forwarding the data stream unprocessed, whereas the active mode of relay operation may comprise performing digital signal processing by the central processor of the relay device during the reception of the input data stream and/or transmission of the at least one relay data stream. The network management engine may monitor during relay operations, one or more communication parameters or conditions associated with the configuration of the one or more of the plurality of distributed transceivers. Beamforming settings and/or antenna arrangement for at least one of the configured distributed transceivers may be configured based on the monitoring. The relay device may determine and/or select connection types and communication protocols that may be applied to the relay operations, and may allocate resources to the one or more of the plurality of distributed transceivers. Resources may be shared among the one or more of the plurality of distributed transceivers during the relay operations.

Figure 1A:
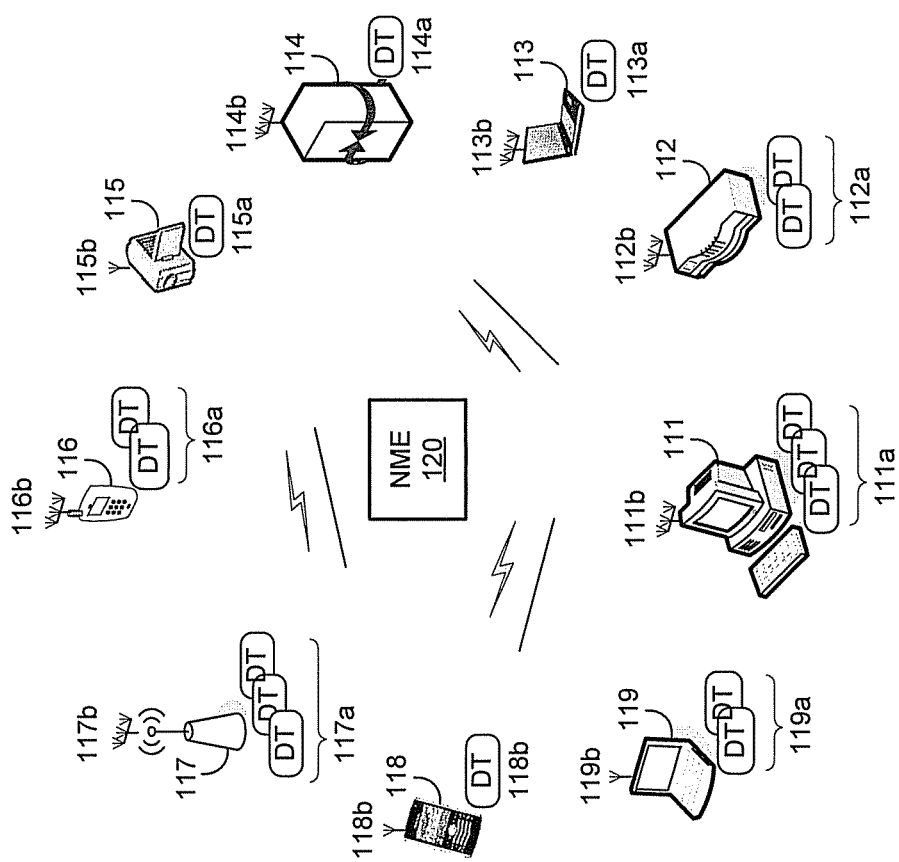
FIG. 1A is a block diagram illustrating an exemplary communication system that support centralized distributed transceiver management, in accordance with an embodiment of the invention.

FIG. 1A is a block diagram illustrating an exemplary communication system that support centralized distributed transceiver management, in accordance with an embodiment of the invention. Referring to FIG. 1A, there is shown a communication network 100 comprising a plurality of application devices, of which application devices 111-119 are displayed.

The application devices 111-119 may comprise suitable logic, circuitry, code, and/or interfaces that may be operable to communicate voice and data with one to another over wired and/or wireless connections. In an exemplary embodiment of the invention, each of the application devices 111-119 in the communication network 100 may comprise one or more distributed transceivers (DTs) for communication in the communication network 100. For example, distributed transceivers 111a through 119a may be integrated in the application devices 111 through 119, respectively, and utilized for receiving and transmitting signals. Each distributed transceiver may be equipped with an independently configurable antenna or antenna array that is operable to transmit and receive signals over the air. For example, the distributed transceivers 111a each may be equipped with an independently configurable antenna array 111b, and the distributed transceiver 118a, however, may be equipped with a single independently configurable antenna 118b to transmit and receive signals over the air. Depending on device capabilities and user preferences, distributed transceivers such as the distributed transceivers 111a within the application device 111, for example, may comprise radios such as a millimeter Wave (mmWave), a WLAN, WiMax, Bluetooth, Bluetooth Low Energy (BLE), cellular radios, WiMAX radio, or other types of radios. In this regard, radios such as mmWave radios may be utilized at very high carrier frequencies for high throughput wireless communications.

In operation, the distributed transceivers 111a through 119a in the communication network 100 are physically positioned and oriented at different locations within corresponding application devices such like laptop, TV, gateway and/or set-top box. The distributed transceivers 111a through 119a may be centrally managed by a single network management engine (NME) 120 of the communication network 100. In an exemplary embodiment of the invention, the network management engine 120 may reside within a specific application device in the communication network 100. The network management engine 120 may be centralized as a full software implementation on a separate network microprocessor, for example. In an exemplary embodiment of the invention, an application device in the communication network 100 may act or function as a master application device or an end-user application device. An application device that comprises the network management engine 120 and/or may have access to manage or control the network management engine 120 to dynamically configure and manage operation of the entire distributed transceivers in the communication network 100 is referred to a master application device. An application device that does not comprise the network management engine 120 and/or may have no access to manage or control the network management engine 120 is referred to as an end-user application device.

In some instances, the application device 111 acts as a master application device in the communication network 100. In an exemplary embodiment of the invention, the network management engine 120 in the master application device 111 may be utilized to configure, control, and manage the entire distributed transceivers 111a through 119a in the communication network 100 to optimize network performance. The application devices 111-119 each may operate in a transmission mode or in a receiving mode. In instances where the master application device 111 is transmitting multimedia information such as images, video, voice, as well as any other form of data to one or more receiving devices such as the end-user application devices 112-116, the network management engine 120 in the master application device 111 may be enabled to monitor and collect corresponding communication environment information from the end-user application devices 112-116. The collected communication environment information may comprise propagation environment conditions, link quality, device capabilities, antenna polarization, radiation pattern, antenna spacing, array geometry, device locations, target throughput, and/or application QoS requirements reported. The network management engine 120 may be operable to dynamically configure the distributed transceivers 111a-116a and associated antenna or antenna array 111b-116b, and to coordinate and manage the operation of the distributed transceivers 111a-116a and associated antenna or antenna array 111b-116b based on the collected communication environment information supplied from the end-user application devices 112-116. In this regard, the network management engine 120 may configure a single application device such as the application device 117 to maintain continuous connection with multiple different application devices such as the application devices 111-113.

The application device capabilities may comprise battery life, number of transceivers, number of antennas per transceiver, device interface types, processing protocols, service types, service classes and/or service requirements. The interface types for the application devices 111-119 may comprise access interface types such as Multimedia over Coax Alliance (MoCA), WiFi, Bluetooth, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Socket Layer (SSL) and control protocols such as Spanning Tree Protocol (STP). The IP layer protocols may comprise IP signaling protocols such as SIP and H.323, and IP media transport protocols such as TCP, UDP, RTP, RTC and RTCP. The link layer protocols may comprise technology-specific PHY and MAC layer protocols such as, for example, Multimedia over Coax Alliance (MoCA), WiFi, Ethernet, Femtocell, and/or cordless.

Although communication among the application devices 111-119 with one or more distributed transceivers is illustrated in FIG. 1, the invention may not be so limited. Accordingly, an application device may be operable to utilize one or more associated distributed transceivers to communicate with one or more application devices with normal transceivers without departing from the spirit and scope of various embodiments of the invention.

In an exemplary aspect of the invention, at least some of the application devices 111-119 may be configured as relay devices, which may be utilized in relaying data streams between two devices—that is a source device and a destination device. Using a particular application device as a relay device may be desirable when no direct links exist or are available between the source device and the destination device. For example, relaying data streams via intermediate relay devices may be utilized where direct Line-of-sight (LOS) links between the source device and the destination device are blocked by physical obstacles. Relaying data streams via intermediate relay devices may also be done in some instances where there is clear LOS between the source device and the destination device, and/or when direct links between these devices are available. For example, in some instances communication resources in the source device and/or the destination device may not be sufficient or optimal to maintain direct links therebetween. Also, in some instances, relaying data streams via intermediate relay devices may result in enhanced performance, and/or in reduction of resource use or power consumption, such as, for example, where communicating data streams via the relay device(s) may require less power or resources than communicating data streams directly between the source device and the destination device.

In an embodiment of the invention, a plurality of application devices may be combined into a relay mesh to provide relay services to any devices that may be in operating proximity to any of the devices in the relay mesh. In this regard, the network management engine 120 may be operable to, for example, dynamically select and/or configure application devices that may be included in the mesh network; to configure distributed transceivers in the mesh network, and antenna or antenna arrays associated with the distributed transceivers; and/or to coordinate and manage the operation of the distributed transceivers and associated antennas or antenna arrays. Furthermore, at least some of the configuration and/or other functions performed by the network management engine 120 may be based on the collected communication environment information supplied from the end-user application devices.

Figure 1B:
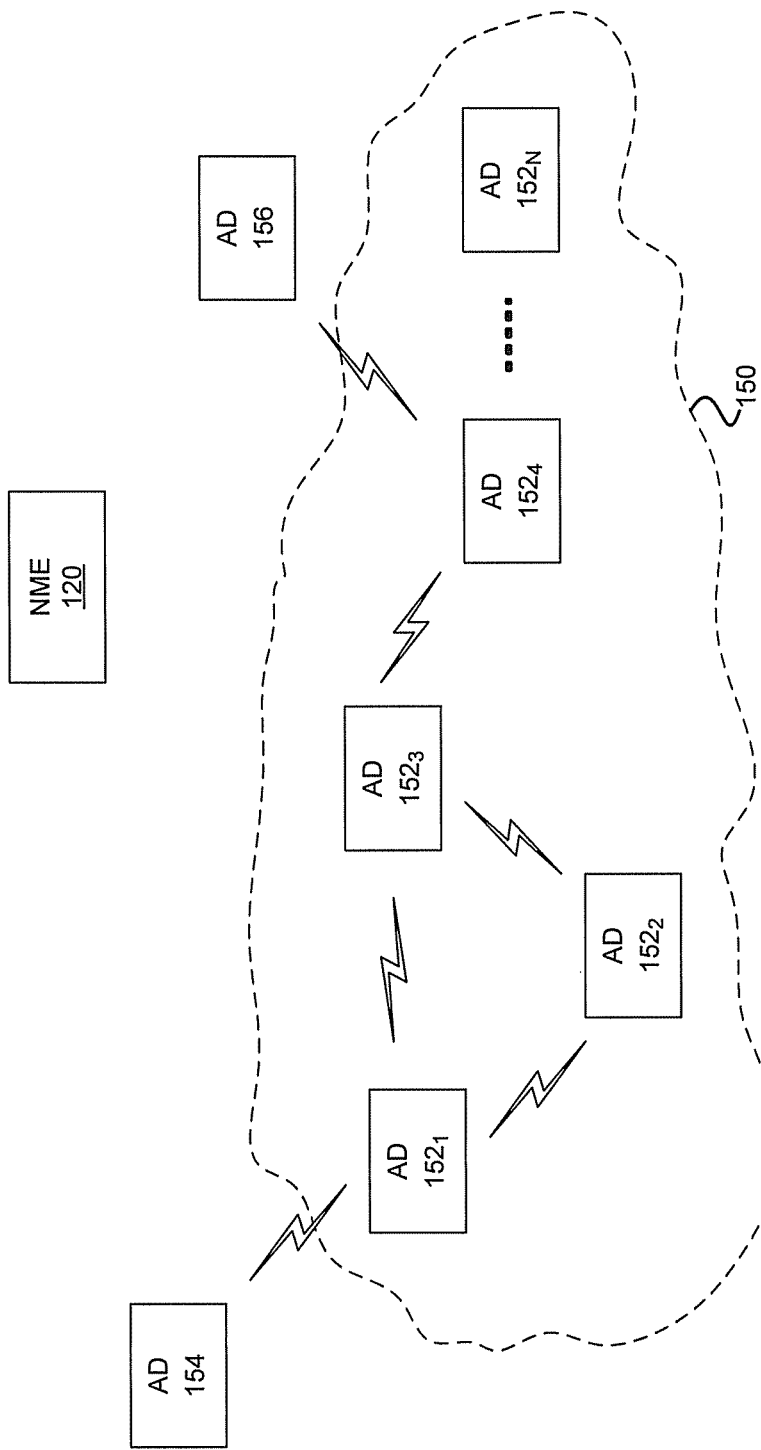
FIG. 1B is a block diagram illustrating an exemplary communication system that supports configuring a mesh of relay devices, in accordance with an embodiment of the invention.

FIG. 1B is a block diagram illustrating an exemplary communication system that supports configuring a mesh of relay devices, in accordance with an embodiment of the invention. Referring to FIG. 1B, there is shown a plurality of end-user application devices (AD) $152_1$-$152_N$, 154, and 156, and the network management engine 120 of FIG. 1A.

The application devices $152_1$-$152_N$, 154, and 156 may be similar to the application devices 111-119, substantially as described with regard to FIG. 1B, for example. In this regard, each of the application devices $152_1$-$152_N$, 154, and 156 may comprise distributed transceivers (DTs), which may be utilized to support distributed based communications, substantially as described with respect to FIG. 1B, for example. In an exemplary aspect of the invention, the application devices $152_1$-$152_N$, 154, and 156 may support a relay mode of operations, whereby one or more application devices may be configured to support forwarding data on behalf of other devices. In some embodiments, the devices that are primarily targeted for relay operation may deploy distributed transceivers with different beamforming and/or performance capabilities (i.e., covering a wide range of performance/capability). This may enable providing better flexibility to select the most suitable and/or optimal set of transceivers, such as depending on network and/or propagation conditions.

In an embodiment of the invention, a plurality of application devices, such as the application devices $152_1$-$152_N$, may be configured to establish a relay mesh 150. In this regard, the relay mesh 150 may be established by forming device-to-device links among the application devices $152_1$-$152_N$. The device-to-device links within the relay mesh 150 may be configured and/or established using distributed transceivers (DTs) of these devices. In this regard, the distributed transceivers of the application devices $152_1$-$152_N$ may be physically positioned and oriented at different locations within corresponding application devices, and may be centrally managed by the network management engine (NME) 120, which may reside within a specific application device $152_x$ in the relay mesh 150, and/or may be centralized as a full software implementation on a separate network microprocessor, for example. The relay mesh 150 may be utilized to relay communications between applications devices, including application devices that are outside the mesh relay 150 but in operating proximity to at least one of the applications devices $152_1$-$152_N$ of the mesh network 150. Relaying communications within the mesh network may comprise traversing more than one application device. For example, to relay communications between application devices 154 and 156, application devices $152_1$, $152_3$, and $152_4$ may be utilized.

In various embodiments of the invention, the relay operations within the relay mesh 150 may be adaptively managed. In this regard, adaptive management of relay operation may comprise dynamically and/or adaptively controlling and/or configuring communications within the relay mesh 150 and/or interactions among the application devices $152_1$-$152_N$, to optimize performance of the application devices $152_1$-$152_N$ and/or the relay mesh 150. For example, the network management engine 120 may query the application devices $152_1$-$152_N$, to determine available resources and/or capabilities thereof, such as number and/or positioning of the distributed transceivers (DTs) of these devices. The network management engine 120 may then utilize data collected based on such query in selecting and/or configuring the devices during relay operations. In some embodiments of the invention, intelligent management of relay operations may comprise asymmetric communication between transceivers; selecting transceiver(s) utilized during the interactions based such criteria as location and/or proximity; adaptive configuration of transceivers (e.g., selection of optimal interface and/or attributes thereof); real-time monitoring of communication environment within the relay mesh 15, and dynamically controlling (re)configuration of transceivers in the mesh based on the monitoring; and/or managing frequency and/or channel allocation and reuse among the application devices and/or the transceivers.

Figure 2:
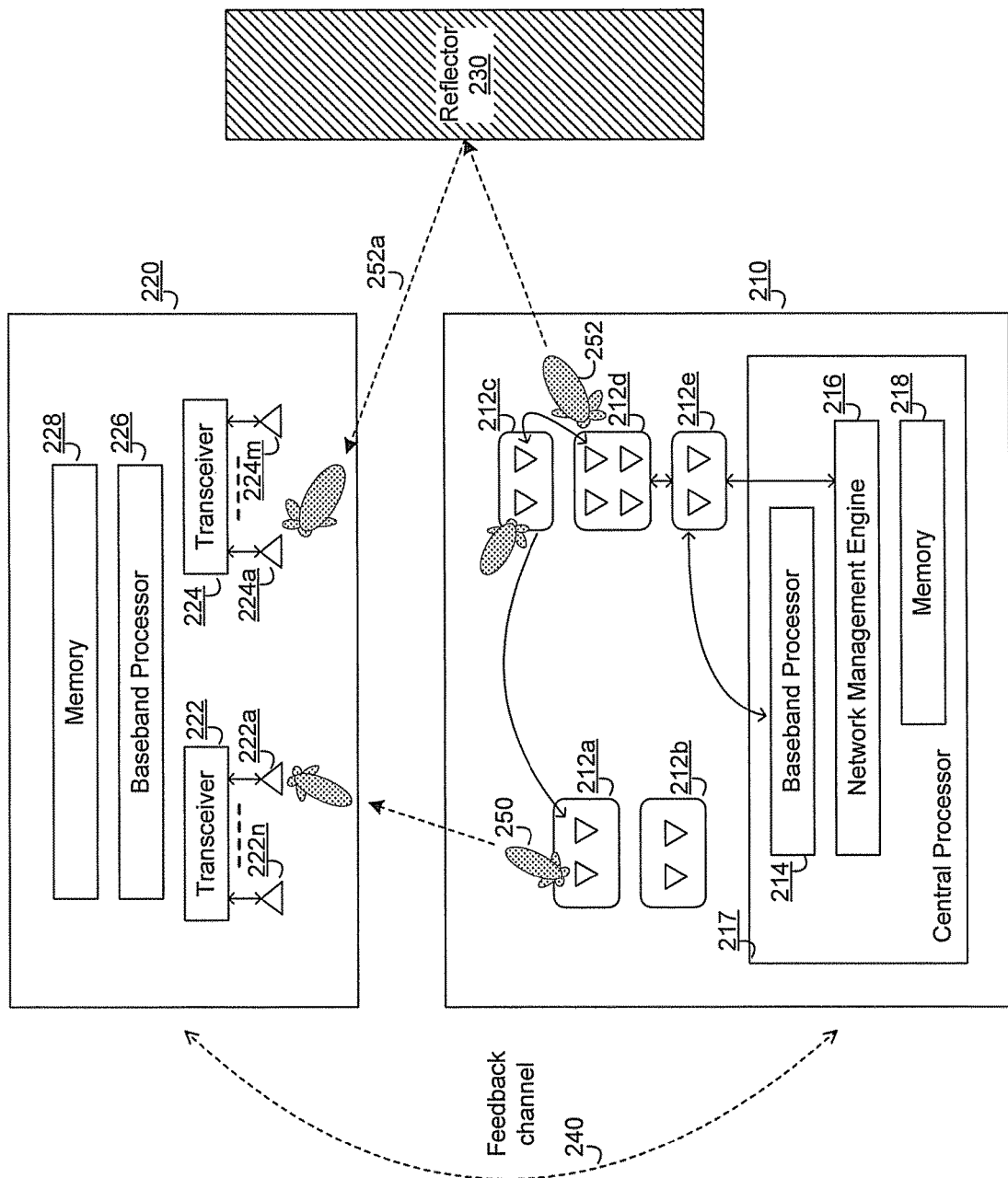
FIG. 2 is a diagram that illustrates an exemplary usage scenario where distributed transceivers are centrally managed to create a high-performance link between a transmitting device and one receiving device, in accordance with an embodiment of the invention.

FIG. 2 is a diagram that illustrates an exemplary usage scenario where distributed transceivers are centrally managed to create a high-performance link between a transmitting device and one receiving device, in accordance with an embodiment of the invention. Referring to FIG. 2, there is shown a master application device 210 and an end-user application device 220.

The master application device 210 may comprise suitable logic, circuitry, interfaces and/or code that may be operable to communicate multimedia information such as images, video, voice, as well as any other forms of data with one or more application devices such as the end-user application device 220. The master application device 210 may comprise a collection of distributed transceivers 212a through 212e, and a central processor 217 that comprises a central baseband processor 214, a network management engine 216 and a memory 218. In an exemplary embodiment of the invention, each of the collection of distributed transceivers 212a through 212e may be physically positioned and oriented at different locations within an application device such as a laptop, TV, gateway, and set-top box. In this regard, the collection of distributed transceivers 212a through 212e may be implemented in various ways such as, for example, a single distributed transceiver integrated in a single chip package; multiple silicon dies on one single chip; and multiple distributed transceivers on a single silicon die. Depending on device capabilities and user preferences, the distributed transceivers 212a-212e may be oriented in a fixed direction or multiple different directions. In another exemplary embodiment of the invention, the collection of distributed transceivers 212a-212e may be operable to receive and/or transmit radio frequency signals from and/or to the end-user application device 220 using air interface protocols specified in UMTS, GSM, LTE, WLAN, 60 GHz/mmWave, and/or WiMAX, for example. The end-user application device 220 may comprise suitable logic, circuitry, interfaces and/or code that may be operable to enable communication with other devices, such as the master application device 210. In this regard, the end-user application device 220 may be substantially similar to the master application device 210. For example, the end-user application device 220 may comprise transceivers 222 and 224, utilizing antennas (or antenna arrays) 222a-222n and 224a-224m, respectively, a baseband processor 226, and a memory 228.

The central baseband processor 214 may comprise suitable logic, circuitry, interfaces and/or code that may be operable to perform baseband digital signal processing needed for transmission and receiving operation of the entire collection of distributed transceivers 212a through 212e. For example, the central baseband processor 214 may be operable to perform waveform generation, equalization, and/or packet processing associated with the operation of the collection of distributed transceivers 212a through 212e. In addition, the central baseband processor 214 may be operable to configure, manage and control orientations of the distributed transceivers 212a-212e. The baseband processor 226 may be substantially similar to the central baseband processor 214.

The network management engine 216 may comprise suitable logic, circuitry, interfaces and/or code that may be operable to monitor and collect communication environment information such as propagation environment conditions, link quality, application device capabilities, transmitter/receiver locations, target throughput, and/or application QoS requirements. The network management engine 216 may utilize the collected communication environment information to configure system, network and communication environment conditions as needed. For example, the network management engine 216 may be operable to perform high level system configurations such as the number of transceivers that are activated, the number of application devices that are being communicated with, adding/dropping application devices to the communication network 100. As shown in FIG. 2, the network management engine 216 is residing in the master application device 210. However, in some embodiments the network management engine 216 may reside on different network devices such as separate network microprocessors and servers on the communication network 100. The network management engine 216 may comprise a full software implementation, for example. In addition, the functionality of the network management engine 216 may be distributed over several devices in the communication network 100. In some embodiments the network management engine 216 may be operable to manage communication sessions over the communication network 100. In this regard, the network management engine 216 may be operable to coordinate operation of baseband processors in the communication network 100 such that various baseband processing may be split or shared among the baseband processors. For example, the network management engine 216 may enable multiple central baseband processors for parallel baseband processing in order to increase throughput if needed.

The memory 218 may comprise suitable logic, circuitry, interfaces and/or code that may be operable to store information such as executable instructions and data that may be utilized by the central baseband processor 214 and/or other associated component units such as, for example, the network management engine 216. The memory 218 may comprise RAM, ROM, low latency nonvolatile memory such as flash memory and/or other suitable electronic data storage. The memory 228 may be substantially similar to the memory 218.

In an exemplary operation, a wireless link may be established between the master application device 210 and the end-user application device 220 through a reflector 230. In an exemplary embodiment of the invention, the master application device 210 may be operable to continuously scan the propagation environment to identify the directions and antenna patterns that result in strong reflected signals at the end-user application device 220. Then, the master application device 210 may associate each strong reflector with one of the collection of distributed transceivers 212a through 212e so as to transmit an independent different data stream to the end-user application device 220 over each distributed transceiver and through each strong reflector. For example, the master application device 210 transmits two data streams to the end-user application device 220 using two different distributed transceivers 212a and 212d that may use the same frequency channel. In particular, the distributed transceivers 212a may choose a beam pattern 250 and orientation for a direct LOS to a transceiver 222, for example, of the end-user application device 220 (the receiving device) and transmit a first data stream over a carrier frequency $RF_1$. On the other hand, the distributed transceivers 212d may choose a beam pattern 252 and orientation that is pointing towards the reflector 230 and transmit a second data stream also over the same carrier frequency $RF_1$. The reflector 230 then may reflect the beam 252 towards a different transceiver 224 of the end-user application device 220. The selection of the beam patterns 250 and 252 may come from the central baseband processor 214 and the network management engine 216. In an exemplary embodiment of the invention, the central baseband processor 214 may profile channel energy for directions of arrival and other schemes. The network management engine 216 may know communication environment information such as the number of users, number of streams needed, and/or available frequency channels. For example, the central baseband processor 214 and the network management engine 216 may select narrow beams for close devices and may select wide beams for further devices, respectively.

In one embodiment of the invention, the master application device 210 may be operable to utilize the reflector 230 for the second data stream, for example, to lower the chances of an object blocking both the first and second data streams, simultaneously. In other words, if a big enough object blocks the LOS between the master application device 210 and the end-user application device 220, the second data stream may likely be intact and sustained by complete direct reflecting through a reflected path 252a. Although FIG. 2 shows one reflector 230, in one embodiment of the invention, several reflectors may be used to transmit one data stream or multiple data streams. The use of multiple reflectors may provide reflection diversification in case one reflector or a sub-set of reflectors are blocked. In other words, instead of directing all transmit power towards one reflector only, the total transmit power may be distributed to propagate over a set of "good" reflectors in the environment. This distribution of power over different reflectors may be done in a controlled, configurable, adaptive, and intelligent manner. For example, reflectors may be chosen and targeted that provide better orthogonality between the different paths.

In FIG. 2, the master application device 210 may use a second reflector at a different location and another distributed transceiver 212c, for example, to communicate with the end-user application device 220 and send a third data stream. Also the reflected path 252a may be caused by more than one reflector where, for example, the distributed transceiver 212e transmits towards the reflector 230 and the reflection transmits towards a second reflector and the reflection of the second reflector reaches the end-user application device 220. In another embodiment of the invention, the first and second data streams in FIG. 2 may comprise the same data content and the use of LOS path and one or more reflector paths may provide link robustness for data content in case an obstacle blocks some of the paths.

The master application device 210 may continuously monitor and collect propagation environment conditions, link quality, device capabilities, locations, target throughput, and/or application QoS requirements reported from the end-user application device 220. In this regard, a feedback or negotiation channel 240 may be utilized to exchange and negotiate system configurations such as number of transceivers within devices, number of antennas per transceivers, the measured channel responses, the sequence of antenna array coefficients being evaluated, and/or device location. The feedback or negotiation channel 240 may be implemented through a WLAN, Bluetooth, and/or 60 GHz link, for example In some embodiments of the invention, the master application device 210 and/or the (slave) end-user application device 220 may deploy a plurality of baseband processors for implementing data processing requirements and/or demands. For example, multiple baseband processors may be deployed to generate and/or decode different data streams that may be transmitted or received by several distributed transceivers. In such configuration, the NME (e.g., NME 216) may be used to enable controlling and/or coordinating operation of the multiple baseband processors. In this regard, several internal connection topologies may be used. In some embodiments, each baseband processor may be dedicated and/or assigned to a subset of distributed transceivers available in the system, and for each baseband processor, ring and/or star topologies (explained later) may be used in interacting with corresponding transceiver(s). In this regard, there may be no data transfer between the subsets. In another embodiment, however, all baseband processors and transceivers (within a device) may be connected together through a ring topology (single cable). In such scenario, the baseband processors may coordinate sharing the single cable, such as based on time-multiplexing (same IF frequency) or frequency-multiplexing (different IF frequencies). The baseband processors may have different power, processing, and/or communication characteristics. Accordingly, in some embodiments, the baseband processor that is most suitable for a particular mode of operation (e.g., lower power consumption meeting the throughput requirement) may be selected and activated, with the other baseband processors remaining inactive and/or getting disabled.

Figure 3:
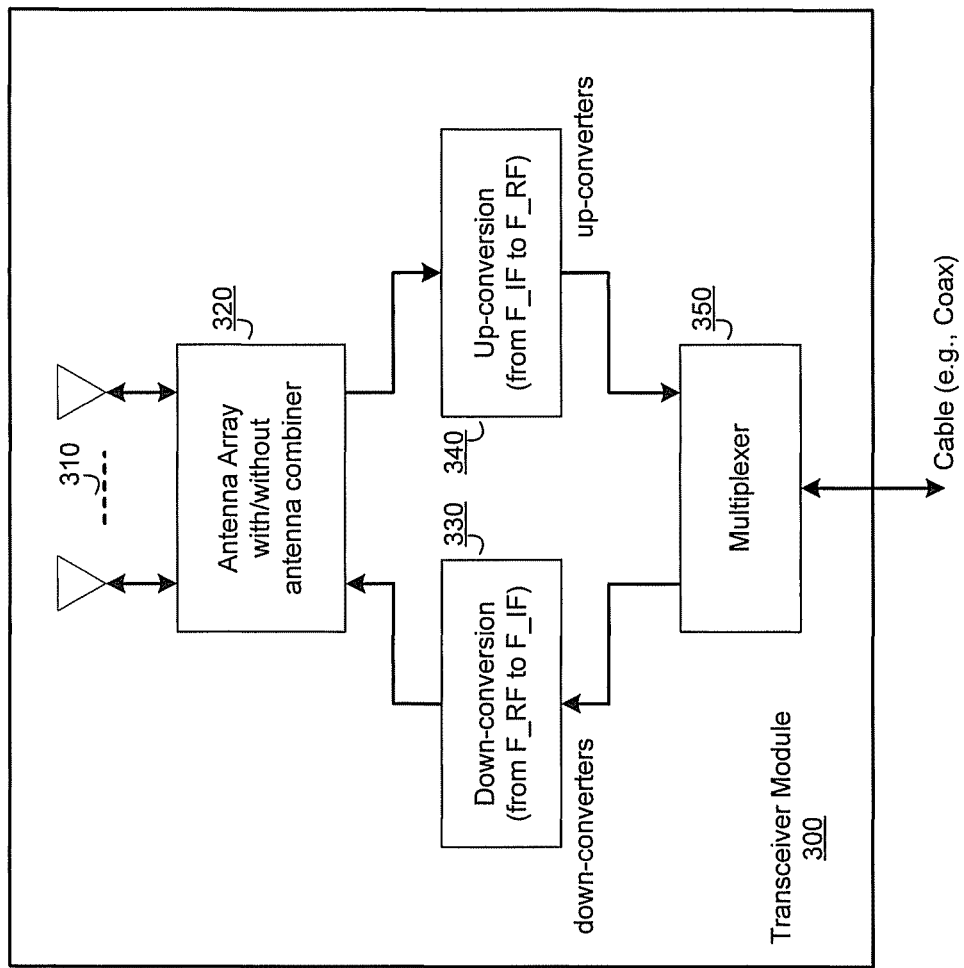
FIG. 3 is a diagram that illustrates an exemplary transceiver module, in accordance with an embodiment of the invention.

FIG. 3 is a diagram that illustrates an exemplary transceiver module, in accordance with an embodiment of the invention. Referring to FIG. 3, there is shown a transceiver 300 comprising an antenna array 310, an antenna array with/without antenna combiner 320, down-converters 330, up-converters 340, and a multiplexer 350.

In an exemplary operation, the antenna array 310 may comprise suitable logic, circuitry, interfaces and/or code that may be operable to transmit and receive radio frequency (RF) signals over the air. For transmission the transceiver 300 may be operable to receive a transmit signal from the central baseband processor 214. The transmit signal received from the central baseband processor 214 may be up-converted to RF frequency via the up-converters 340. For reception, the transceiver 300 may pass a receive signal from the antenna array 310 after down-conversion to the central baseband processor 214. The multiplexer 350 may comprise suitable logic, circuitry, interfaces and/or code that may be operable to multiplex the transmit signal received from the central baseband processor 214 and the receive signal supplied from the antenna array 310. In this regard, the multiplexer 350 may utilize either time-division-multiplexing or frequency-domain-multiplexing to communicate the transmit signal and the receive signal over the same medium such as a cable.

The antenna array with/without antenna combiner 320 may comprise suitable logic, circuitry, interfaces and/or code that may be operable to scale and/or phase-shift signals before the down-converters 330 and/or signals after the up-converters 340. For example, in transmission operation the signal provided by the up-converters 340 may be phase-shifted by the shifter by different values. The resulting phase-shifted signals may be fed to different antenna elements within the antenna array 310. In another embodiment of the invention, the antenna array 310 may be oriented in a fixed direction or multiple different directions depending on antenna types and user preferences. For example, the antenna array 310 may be implemented as a fixed directional antenna array to provide maximal directionality (with no explicit combiner). The same two modules, that is, the antenna array 310 and the antenna array with/without antenna combiner 320, may be correspondingly utilized in a reception operation for the transceiver 300. In an exemplary embodiment of the invention, the operation of the antenna array with/without antenna combiner 320 may be managed or programmed by the network management engine 216.

The down-converters 330 may comprise suitable logic, circuitry, interfaces and/or code that may be operable to translate a radio frequency (RF) received from the antenna array 310 to an intermediate-frequency (IF) signal during reception. The up-converters 340 may comprise suitable logic, circuitry, interfaces and/or code that may be operable to translate an intermediate-frequency (IF) signal of a corresponding baseband signal supplied from the central baseband processor 214, for example to a RF signal during transmission.

Figure 4:
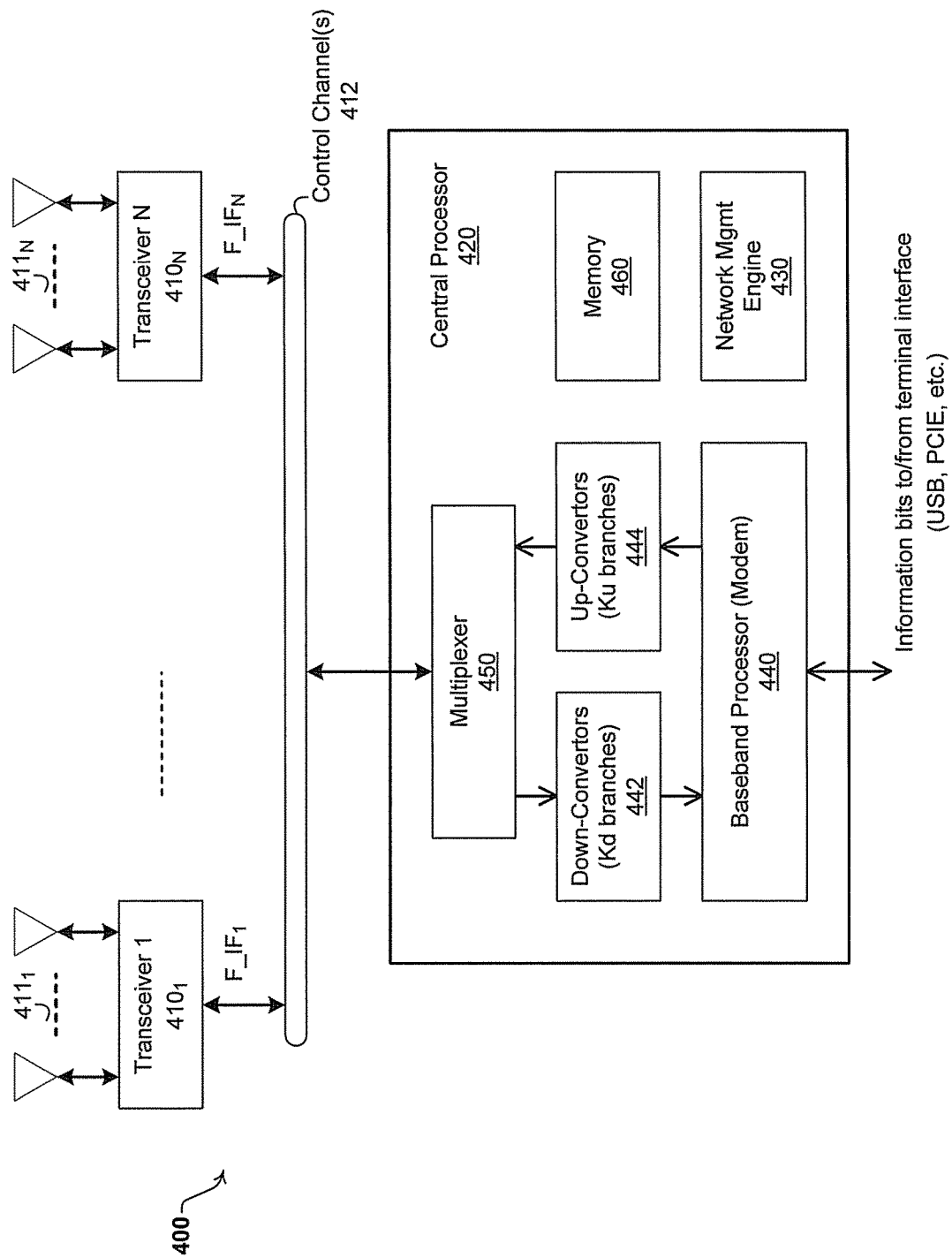
FIG. 4 is a diagram illustrating an exemplary application device with a collection of distributed transceivers that are arranged in a star topology, in accordance with an embodiment of the invention.

FIG. 4 is a diagram illustrating an exemplary application device with a collection of distributed transceivers that are arranged in a star topology, in accordance with an embodiment of the invention. Referring to FIG. 4, there is shown an application device 400, which may comprise a central processor 420 that is connected to a collection of transceivers $410_1$-$410_N$. As shown, the collection of transceivers $410_1$-$410_N$ may be connected to the central processor 420 in a star topology with direct separate cables, for example, from the central processor 420 to each of the collection of transceivers $410_1$-$410_N$.

The distributed transceivers $410_1$-$410_N$ and the central processor 420 may be connected using different topologies. For example, the distributed transceivers $410_1$-$410_N$ may be connected to the central processor 420 using a star topology, whereby direct separate cables may be used, for example, to connect the central processor 420 to each of the collection of transceivers $410_1$-$410_N$. Alternatively, a ring topology may be utilized, whereby a single movable cable or connector, for example, may be used to couple the central processor 420 to any particular one of the distributed transceivers $410_1$-$410_N$ at any given point. In other words, the central processor 420 may connect to one of the distributed transceivers $410_1$-$410_N$, and that connection may then be moved to a different transceiver when needed. One or more control channels between the central processor 420 and the distributed transceivers $410_1$-$410_N$ may be utilized for configuring and managing corresponding transceivers. The number and/or structure of the control channels may differ based on the connectivity topology. For example, with star topology, a plurality of control channels $412_1$-$412_N$ may be to connect the central processor 420 to each of the distributed transceivers $410_1$-$410_N$, and may be utilized for configuring and managing the transceivers $410_1$-$410_N$, respectively. In a ring topology, a single control channel 412 may be used, and may be utilized to the central processer 420 to each particular distributed transceiver $410_x$ at any given point, to enable configuring and managing that transceiver.

While the interface between the central processor 420 and the distributed transceivers $410_1$-$410_N$ may be described as utilizing cable (i.e., the central processor 420 being connected to the distributed transceivers $410_1$-$410_N$ via one or more cables), the invention may not be so limited. Accordingly, in some embodiments of the invention, the cable connection between the central baseband processor and the distributed transceivers may be substituted with an optical connection, printed-board connection, Ethernet cable, or another wireless connection.

The central processor 420 comprises a baseband processor 440, a network management engine 430, down-converters 442, up-converters 444, a multiplexer 450 and a memory 460. The baseband processor 440 may comprise suitable logic, circuitry, interfaces and/or code that may be operable to provide MODEM functionality. In this regard, the central processor 420 may be operable to perform various baseband digital processing such as MIMO, OFDM, channel coding, HARQ, channel estimation and equalization, beamforming algorithms, Timing/Carrier recovery and synchronization. The network management engine 430 may operate in substantially the same manner as the network management engine 218 in FIG. 2. During transmission, a baseband signal supplied from the baseband processor 440 may be translated into an intermediate-frequency (IF) signal. The up-converters 444 may further translate the IF signal to a final radio-frequency (RF) and send it over the air through an antenna array such as the antenna array $411_1$. For reception, the transceiver $410_1$, for example, may pass a received RF signal from the antenna array $411_1$ to the down-converters 442. The down-converters 442 may translate the RF signal into an IF signal. The IF signal may further be translated to a baseband signal to the baseband processor 440, for example. The multiplexer 450 may be responsible for multiplexing receive/transmit signals utilizing either time-division-multiplexing or frequency-domain-multiplexing. The memory 460 may comprise suitable logic, circuitry, interfaces and/or code that may be operable to store information such as executable instructions and data that may be utilized by the baseband processor 440 and/or other associated component units such as, for example, the network management engine 430. The memory 360 may comprise RAM, ROM, low latency nonvolatile memory such as flash memory and/or other suitable electronic data storage.

In some embodiments of the invention, the interface between the central processor 420 and the distributed transceivers $410_1$-$410_N$ may also be configured to allow for supporting the transceivers $410_1$-$410_N$ having digital processing and mixed-signal capability—i.e., to allow for interactions based on non-analog IF connections. For example, the transceivers $410_1$-$410_N$ may include analog-to-digital-converters (ADCs) and digital-to-analog-converters (DACs). In such scenario, a transceiver $410_x$ may receive digital bits from the central processor 420 (through a digital link), after processing via the baseband processor 440 for example, and may use its internal DAC to generate the analog waveform and then perform the frequency up-conversion and beamforming steps. Similarly, a transceiver $410_x$ may receive an RF waveform, down-convert it, and then use its internal ADC to digitize the waveform and send the digital bits over a digital connection/cable to the centralized processor 420 (where it may be further processed via the baseband processor 440 for example). In other embodiments of the invention, the transceivers $410_1$-$410_N$ may comprise more digital processing blocks, in addition to ADC/DAC blocks. In such scenario, a portion of processing within the central processor 420 may be moved (e.g., in terms of partitioning) to the transceivers $410_1$-$410_N$. In the above embodiments—i.e., when there may be need for digital based interfacing between the central processor and the transceivers—digital connections and/or interfaces such as Ethernet and various memory bus protocols may be deployed.

The distributed transceivers $410_1$-$410_N$ may operate in various modes such as spatial diversity mode, frequency diversity mode, multiplexing mode, multiple-input-multiple-output (MIMO) mode, and/or relay mode. Furthermore, in some embodiments, the distributed transceivers $410_1$-$410_N$ may be configured to switch between spatial diversity mode, frequency diversity mode, multiplexing mode, multiple-input-multiple-output (MIMO) mode, and/or relay mode based on corresponding propagation environment conditions, link quality, device capabilities, device locations, usage of resources, resource availability, target throughput, application QoS requirements.

In spatial diversity mode, the central processor 420 may be operable to utilize the distributed transceivers $410_1$-$410_N$ to establish a spatial diversity link with intended end user device such as the end-user application device 220. For example, only a portion of the distributed transceivers $410_1$-$410_N$ that may have strong propagation channel responses are activated and other transceivers are switched off for power saving. In another example, the distributed transceivers $410_1$-$410_N$ may be arranged such that the master application device 210 (the transmitter) with available LOS towards the end-user device 220 (the receiver) may be configured to directly beam towards the receiver. In an exemplary embodiment of the invention, each active distributed transceiver may communicate data streams utilizing the same final carrier frequency. In frequency diversity mode, the central processor 420 may manage the distributed transceivers $410_1$-$410_N$ similar to spatial diversity mode except that each active distributed transceiver may utilize a different final carrier frequency if such frequency spectrum channel is available.

In multiplexing mode, the central processor 420 may manage the distributed transceivers $410_1$-$410_N$ in such a way that different streams of data may be transmitted through different sets of the distributed transceivers $410_1$-$410_N$. For example, in multiplexing mode, different distributed transceivers of the distributed transceivers $410_1$-$410_N$ may be dynamically programmed such that each transceiver's maximum pattern gain may be pointing to a different direction or reflector. As the environment changes (and hence location of reflectors and end user unit change), the antenna pattern of the distributed transceivers $410_1$-$410_N$ may be re-adjusted. In MIMO mode, the central processor 420 may manage the distributed transceivers $410_1$-$410_N$ in such a way that different streams of data may be transmitted through different sets of the distributed transceivers $410_1$-$410_N$ to a single receiver device such as the end-user application device 220.

In relay mode, the central processor 420 may manage the distributed transceivers $410_1$-$410_N$ to support relay mode of operation, whereby the application device 400 may be utilized in relaying data streams between two other devices. In this regard, the star topology implementation may particularly be suited for relay operations, enabling reception of input data stream from a first device, via a first set of the distributed transceivers $410_1$-$410_N$, and (re)transmission of the received data stream to a second device via a second set of the distributed transceivers $410_1$-$410_N$. The selection of the first and second sets of the distributed transceivers $410_1$-$410_N$, and the configuration thereof may be performed adaptively and/or dynamically. In this regard, the transceivers utilized in receiving and/or transmitting the relayed streams may be selected in order to optimize the relaying of communication between the distributed transceivers. This may comprise, for example, selecting and/or configuring the transceivers such that radio frequencies and/or channels may be reused efficiently. For example, use of beamforming may enable mitigating potential interference between incoming and outgoing signals so as to allow using the same radio frequency (RF). In other words, the same RF channel/spectrum may be reused in a manner that may allow for maintaining links with the two end devices utilizing physically separated transceivers that may use non-overlapping antenna patterns to minimize interference. Furthermore, the transceiver(s) maybe be configured to use only some of the antennas available therein (e.g., subset of the antenna array), and/or may allow for use of transceivers without array processing.

In an embodiment of the invention, the application device 400 may be dynamically configured to switch between relay mode of operation and other modes of operation, such as spatial diversity, frequency diversity, multiplexing, and/or MIMO modes of operation. The switching between the modes may be done based on the network management engine 430 reading and analyzing of communication related data, which may comprise data pertaining to network requirements, data traffic, throughput and/or QoS requirements, spectrum availability, and/or desire for relay nodes. Once the communication related data is read and/or analyzed, the network management engine 430 and/or the central processor 420 may then use policies and/or rules to determine when a transition to and/or from relay mode of operation may be warranted. For example, one such rule/policy may provide the highest QoS for a first device regardless of other devices/users. In this case, even if there is another device/user that is requesting access to spectrum, the network management engine 430 may still continue to configure the first device to occupy two frequency channels in order to guarantee higher QoS and link reliability for the first device. In another example, if the rule/policy is more neighbor-friendly, the network management engine 430 continuously instructs the first device to see if the throughput requirements can be satisfied by using only one frequency channel and by relying on "spatial multiplexing." As soon as the first device finds sufficiently orthogonal directions in one frequency channel, the "network management engine" instructs the first device to exit the "Frequency Diversity" mode in order to free up bandwidth for other devices/users. Based on this policy, even if no other device is requesting access for frequency spectrum, the first device still switches to using one frequency channel as soon as its QoS becomes satisfied.

Figure 5A:
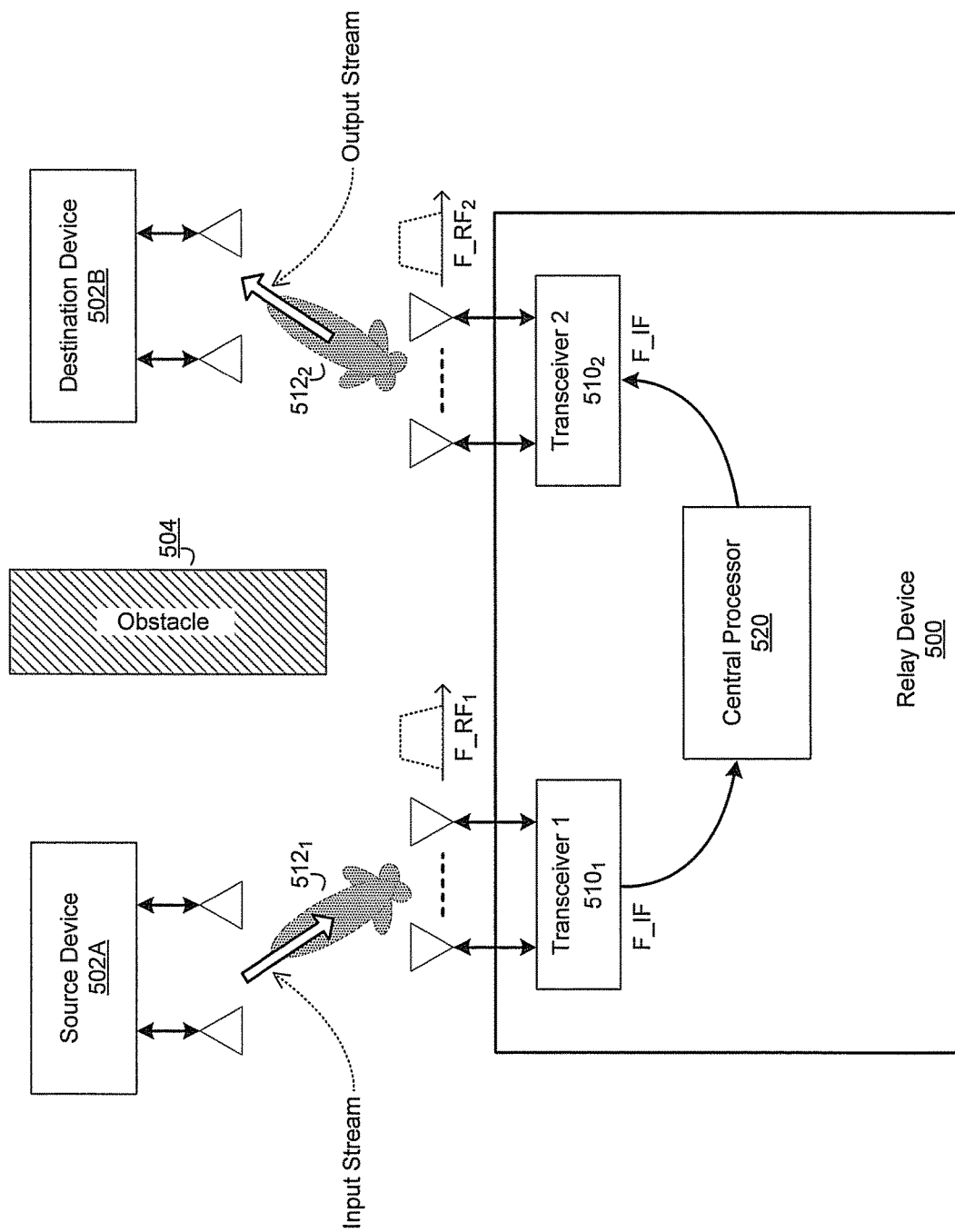
FIG. 5A is a diagram illustrating an exemplary relay device that utilizes distributed transceivers in forwarding data streams, in accordance with an embodiment of the invention.

In an embodiment of the invention, the relay mode of operation may incorporate attributes and/or configuration policies and/or rules pertaining to one or more of the other modes of operations. In this regard, configuring the application device 400 to relay mode of operation may comprise selecting and/or applying elements from one or more of the spatial diversity, frequency diversity, multiplexing, and/or MIMO modes of operations. For example, when utilized as a relay device, the distributed transceivers of the application device 400 may be configured to incorporate spatial diversity, frequency diversity, multiplexing, and/or MIMO to receive input data streams from the source device and/or for retransmission(s) to one or more of the destination devices FIG. 5A is a diagram illustrating an exemplary relay device that utilizes distributed transceivers for forwarding data streams, in accordance with an embodiment of the invention. Referring to FIG. 5A, there is shown a relay device 500, a source device 502A, a destination device 502B, and an obstacle 504.

The source device 502A and the destination device 502B may correspond to the original source of the relayed data stream and the ultimate destination for the relayed data stream. Alternatively, one or both of the source device 502A and the destination device 502B may correspond to another relay device, such as when the relay device 500 joins a relay mesh, such as relay mesh 150. In this regard, one or both of the source device 502A and the destination device 502B may correspond to a relay device traversed during relaying of data streams between the original source and the intended destination device(s) for the data stream.

The relay device 500 may comprise an application device supporting distributed transceiver (DT) structure, similar to the end-user application device 210 of FIG. 2 and/or any of the application devices $152_1$-$152_N$ of FIG. 1B, for example. In this regard, the relay device 500 may be operable to support relay modes of operations, whereby the relay device 500 may be configured to relay data streams between two devices, such as the source device 502A and the destination device 502B. The relay device 500 may comprise a central processor 520 and a plurality of transceivers $510_x$, of which a first transceiver $510_1$ and second transceiver $510_2$ are shown.

The central processor 520 may be substantially similar to the Central Processor 420, as described with respect to FIG. 4. In this regard, the central processor 520 may additionally be operable to support and/or manage relay mode of operation related functions in the relay device 500. In particular, the central processor 520 may be operable to select and/or configure transceiver(s) that may be optimally utilized to handle reception and retransmission of relayed data streams.

In some embodiments, the relay device 500 may use different carrier frequencies (e.g., 900 MHz, 2.4 GHz, 2.7 GHz, 5 GHz, 60 GHz, etc.) and/or different wireless protocols (e.g., IEEE 802.11a/b/g/n/ac/ad, LTE, WiGig, etc.) to connect to devices 502A and 502B. For example, the connection to device 502A may be configured over 60 GHz carrier frequency using, for example, WiGig air interface, whereas the connection to device 502B may be configured over 2.7 GHz using, for example, LTE air interface. In some embodiments, the total available distributed transceivers within device 500 may be dynamically allocated to different relay links, such as based on the links' requirements (e.g., link throughput, link distance). For example, the NME (e.g., NME 430) may decide to allocate three distributed transceivers to establish a link with device 502A (where those three transceivers may be configured in spatial/frequency diversity or MIMO modes) and to allocate only one distributed transceiver to establish a link with device 502B.

In some embodiments, the relay device 500 may establish relay links to more than two devices. For example, device 500 may receive data from two source devices (utilizing several of its transceiver resources), may combine and/or merge the data, then may split the data into three data streams, and send the three data streams to three destination devices (by utilizing several of its transceiver resources).

In some embodiments, a device with distributed transceivers (e.g., device 500) may take the role of an "Access Point" or "Base Station". In this case, the access point device may utilize its transceiver resources to connect (transmit/receive) to multiple end devices, such as by dynamic allocation of frequency band resources and distributed transceiver resources. The access point device may use some of its transceiver resources to establish a "wireless backhaul link" to other access points or any other node in the network. All modes of operation (spatial diversity, frequency diversity, spatial multiplexing, and MIMO processing) may be utilized by the access point device for any of its connections.

Each of the transceivers $510_1$ and $510_2$ may be similar to any of the distributed transceivers $410_x$, substantially as described with respect to FIG. 4. In this regard, each of the transceiver $510_1$ and transceiver $510_2$ may comprise a plurality of antennas, which may be configured in accordance with particular mode of operation, which may comprise in addition to spatial diversity mode, frequency diversity mode, multiplexing mode and multiple-input-multiple-output (MIMO) mode, one or more relay modes of operations. For example, available relay modes of operation may comprise a passive (or pass-through) mode of operation and active mode of operation. In passive mode of operation, no processing of the received, relayed signal is performed prior to re-transmission. In this regard, when operating in passive relay mode, the relay device 500 may simply down-convert the received radio frequency $RF_1$ waveform of the signals received from the source device 502A to intermediate frequency IF, may re-amplify the signal, and then may up-convert the IF waveform to frequency $RF_2$ for transmission to the destination device 502B, without requiring any data demodulation by the central processer 520. The passive mode of operation may be utilized when the quality of the received waveform is deemed sufficient for passive relaying. In this regard, the quality of received waveform may be determined based on calculation of signal-to-noise ratio (SNR). With active mode of operation, some processing may be performed within the relay device 500, such as via the central processor 520. In this regard, during active relay mode, the received waveform $RF_1$ may be demodulated by the central processor 520, after conversion to the intermediate frequency IF, and then re-modulated to be transmitted to the destination device 502B over radio frequency $RF_2$.

In operation, the relay device 500 may be configured in relay mode of operation. In this regard, the relay device 500 may relay data streams between two different devices. The relaying via the relay device 500 may be necessitated by the lack of line-of-sight (LOS) between the source device 502A and the destination device 502B, such as due to the obstacle 504, which prevents establishing direct links between the devices. Alternatively, data may be relayed via the relay device 500 even when the source device 502A and the destination device 502B may be able to establish direct links, but use of such direct links may be undesirable. In this regard, determining that relaying data via the relay device 500 may be optimal may be based on capabilities of the relay device 500, the source device 502A, and/or the destination device 502B. For example, one or both of the source device 502A and the destination device 502B may be a low-power device (or temporarily low on battery charge) which may not be able to provide the transmit power required for providing the necessary beamforming gain, and using the relay device 500 may enable saving power in the device(s).

During typical relay operation, the relay device 500 may receive a stream of data from the source device 502A, over carrier frequency $RF_1$ and at a particular direction D1, and may subsequently retransmit the received data stream to the destination device 502B, over frequency $RF_2$ and at a different direction D2. In some instances, the reception and retransmission can be done concurrently, over the same or different frequency channels. Alternatively, the reception and retransmission may be performed in a time-multiplexed manner. In instances when a plurality of relay modes of operations are available, such as passive mode and active mode, a particular mode of operation may be selected, with communication related components and/or operations being configured based on that selection. The particular mode of operations may be selected based on monitoring and/or determining various communication and/or performance related parameters. For example, passive mode of operation may be selected when quality of received signal, which may be determined based on measured SNR, may be deemed sufficient to enable retransmission without requiring additional processing (demodulation and re-modulation) of the carried data.

In some embodiments of the invention, frequencies $RF_1$ and $RF_2$ may be the same radio frequency (RF), to enable maximizing reuse of frequency spectrum. The use of the same radio frequency may be made possible by use of propagation configuration techniques that may mitigate possible interference between the reception paths and the retransmission paths. In this regard, the relay device 500 may utilize non-overlapping (non-aligned) beam patterns $512_1$ and $512_2$ for receiving and retransmitting so that the same frequency and/or channel may be utilized for both reception and re-transmission.

In some embodiments of the invention, the relay device 500 may perform various optimization measures to improve the effectiveness and/or efficiency of relay operations. For example, the relay device 500 may adaptively select antenna (s) used in receiving and/or transmitting the relayed data streams, to minimize the number of antennas used. In this regard, the relay device 500 may measure the signal power of the signal received from source device (502A). Based on the link throughput between the source device (502A) and the relay device 500, the relay device 500 may utilize the minimum number of antennas required to establish and maintain the link (with sufficient margin). These antennas may then be combined and connected to one RF-to-IF converter chain. The antennas may correspond to an antenna array (or subset thereof) of a single transceiver, such as transceiver $510_1$. Alternatively, the minimum number of antenna required may be a combination from multiple transceivers.

For example, the relay device 500 may use on the receive side, a particular transceiver (e.g., transceiver $510_1$) with all antennas thereof being active, and also require use of a second transceiver (e.g., transceiver $510_2$), with only a subset of antennas thereof being active. On the transmit side, a subset or all of the remaining antennas of the second transceiver may be grouped together and connected to the other IF-to-RF up-convertor, for transmission of signals to the destination device 502B. In this regard, determining and/or selecting the transmit side antennas may depend on the distance to the destination device 502B, the transmit power per antenna, and/or the desired width of the antenna pattern. In some embodiments, the NME may decide to allocate a subset of transceivers to receive incoming waveform (e.g., depending on channel/throughput requirements) and allocate another subset to transmit the signal to the destination device. When multiple transceivers are utilized for each link, then various diversity configurations (frequency, spatial) may be utilized based on channel/traffic/ throughput conditions.

The relay device 500 may also be operable to improve frequency spectrum reuse, whereby the relay device 500 may coordinate the time slots used for packet transmissions and receptions from the source device and/or to the destination device(s), to minimize the cross-interference when the same frequency is used. In this regard, the relay device 500 may use the same time slots to simultaneously transmit packets to both source device and the destination device(s) while using common time slots for simultaneously receiving packets. This may enable minimizing co-interference between transceiver(s) used on the receive side (e.g., transceiver $510_1$) to transceiver(s) used on the transmit side (e.g., transceiver $510_2$), and vice versa.

The relay device 500 may re-use the same frequency channel for linking to both the source device 502A and the destination device 502B—i.e., $F\_RF_1$ is the same as $F\_RF_2$. This mode of operation may be enabled when, for example, less frequency channels are available or the frequency channels are being used by other devices in the vicinity. The relay device 500 may consider various communication and/ or network related conditions when determining if/when to switch between the two modes of operations—that is between using different frequency channels for $F\_RF_1$ and $F\_RF_2$ and using the same frequency channels for $F\_RF_1$ and $F\_RF_2$. Exemplary conditions that may be considered comprise, for example: 1) the distance between transceivers $510_1$ and $510_2$ within the relay device $500s$ (e.g., the larger the separation, the higher the weight that the system may give to reusing the same frequency); 2) the widths of antenna beam patterns of transceivers $510_1$ and $510_2$, as well as beam patterns of source device 502A and the destination device 502B (e.g., the narrower the beam patterns, the less the cross interference; hence the system gives a higher weight to reusing the same frequency); 3) level of orthogonality (or angular separation) between the antenna patterns of transceivers $510_1$ and $510_2$ within the relay device 500 (e.g., the better the orthogonality, the system gives higher weight to reusing the same frequency); 4) angular separation, or difference in directions of links established by the relay device 500 to the source device 502A and the destination device 502B (e.g., the larger the angular separation, the system gives higher weight to reusing the same frequency); and 5) link quality requirements, such as link SNR requirements (e.g., the lower the SNR requirements, the links can tolerate higher level of interference; hence the system gives higher weight to reusing the same frequency).

In some embodiments of the invention, resources may be shared during relay operations in the relay device 500, such as when the relay device 500 is utilized to concurrently relay different steams, for example between different pairs of devices. In this regard, the distributed transceivers of the relay device 500 may be configured to establish multiple parallel wireless links, and resources of the relay device 500 may be optimally shared during handling of communications via these parallel wireless links. For example, dedicated transceivers may be assigned to different traffic categories—e.g., one link dedicated to CPU sharing, one to memory sharing for reduced latency, and one dedicated to internet traffic. Also, different types of traffic may be partitioned to dedicated wireless links. For example, low latency traffic may use a low latency link, whereas Internet data traffic may be routed over an Internet link.

Figure 5B:
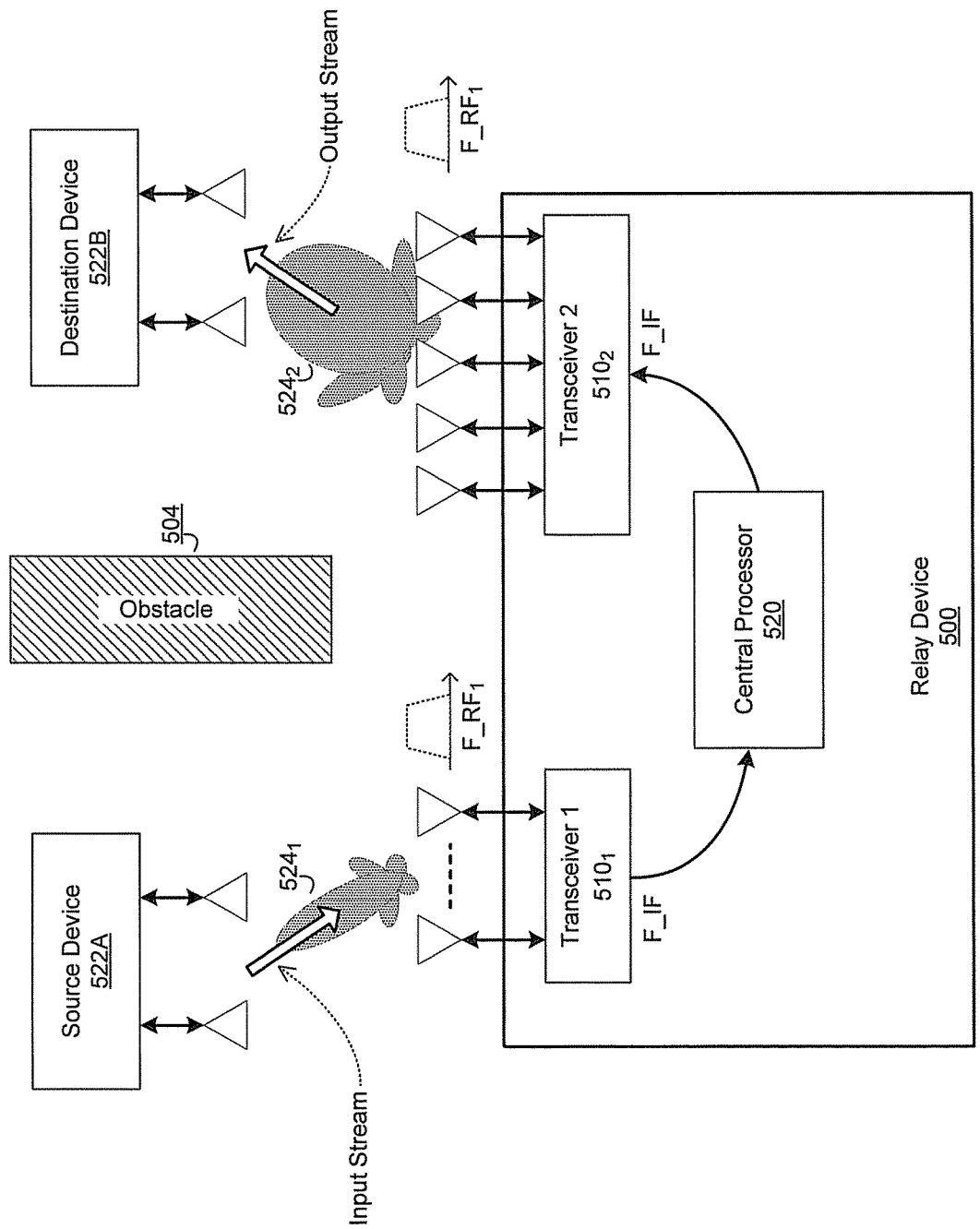
FIG. 5B is a diagram illustrating an exemplary relay device that utilizes distributed transceivers for forwarding data streams, with varying beamforming configurations for the receive side and the transmit side, in accordance with an embodiment of the invention.

FIG. 5B is a diagram illustrating an exemplary relay device that utilizes distributed transceivers for forwarding data streams, with varying beamforming configurations for the receive side and the transmit side, in accordance with an embodiment of the invention. Referring to FIG. 5B, there is shown the relay device 500 of FIG. 5A. Also shown in FIG. 5B is a source destination device 522A and a destination device 522B. The source destination device 522A and the destination device 522B may be similar to the source destination device 502A and the destination device 502B, substantially as described with respect to FIG. 5B.

In operation, the source destination device 522A and the destination device 522B may utilize the relay device 500 for relaying data streams between the destination device 522A and the destination device 522B when communicating the data streams between the devices is not possible or desirable. In some instances, the capabilities of the source and destination devices may vary, and/or communication requirements and/or limitations associated with transmission or reception of data to/from the devices may be different. As such, the relay device 500 may be operable to configure the transceiver resources based on the capabilities and/or limitations of each of the source and destination devices, respectively, and/or links therewith, in a manner that may allow for different beamforming characteristics—e.g., beams having different width. For example, the source device 522A may comprise a low-transmit-power and/or low-power-supply device, and/or may comprise limited communication capabilities—e.g., comprising only one antenna transmitter, such as when the source device 522A comprises a smartphone. The source device 522A, however, may need to establish a high-throughput link to the destination device 522B, such as when the destination device 522B may be a TV or similar display-capable device, to which the source device 522A may seek to direct its multimedia streams for enhanced playback (i.e., larger/better screen).

In instances where the destination device 522B is located too far from the source device 522A (e.g., across a large room), however, the capabilities and/or resources (including remaining battery charge) of the source device 522A may not be sufficient to create and/or maintain such a link. Rather, the data streams may be sent indirectly, through the relay device 500 for example, such as when the relay device 500 is located close to the source device 522A and/or where the relay device 500 may comprise more capabilities and/or resources (e.g., a laptop), and the ability to re-configure its antenna and transceiver resources into relay operation mode. In such scenario, the source device 522A may only need to configure its antenna(s) to create a short link to the relay device 500, and may be able to achieve the required throughput (due to the shortness of the distance) while forming a narrow beam pattern $524_1$ that would not interfere with the transmission of the relay device 500. This may greatly lower the power consumption in both the smartphone and the relay device 500, associated with communication of the input data stream from the source device 522A to the relay device 500 without degrading the link quality.

On the transmit side, the relay device 500 may use its remaining antenna and transceiver resources (or a subset thereof) to create a link from the relay device 500 and the destination device 522B. In this regard, the relay device 500 may allocate more resources, including a larger number of antennas, to the transmit side, and accordingly the relay device 500 may be able to achieve more omni-directional antenna pattern (wider beam lobe) $524_2$, while maintaining a high average omni-transmit power. In other words, the relay device 500 may be able to establish a transmit side link that is sufficiently powerful to ensure delivery of the data stream to the destination device 522B, while not encountering any interference issues. The ability to establish the link with a wider beam lobe may make the link less susceptible to direction estimation errors. This asymmetric and dynamic allocation of resources by the relay device 500 among its links with the source and destination devices may be determined and/or configured based on a plurality of communication or performance parameters, such as, for example, distance between the relay device 500 to the source device 522A and destination device 522B, respectively; power available at the transmit and/or receive sides; quality (e.g., SNR) of the links; power capabilities of the source device 522A and/or destination device 522B; and/or antenna beamforming capabilities of the source device 522A and/or destination device 522B.

Figure 6:
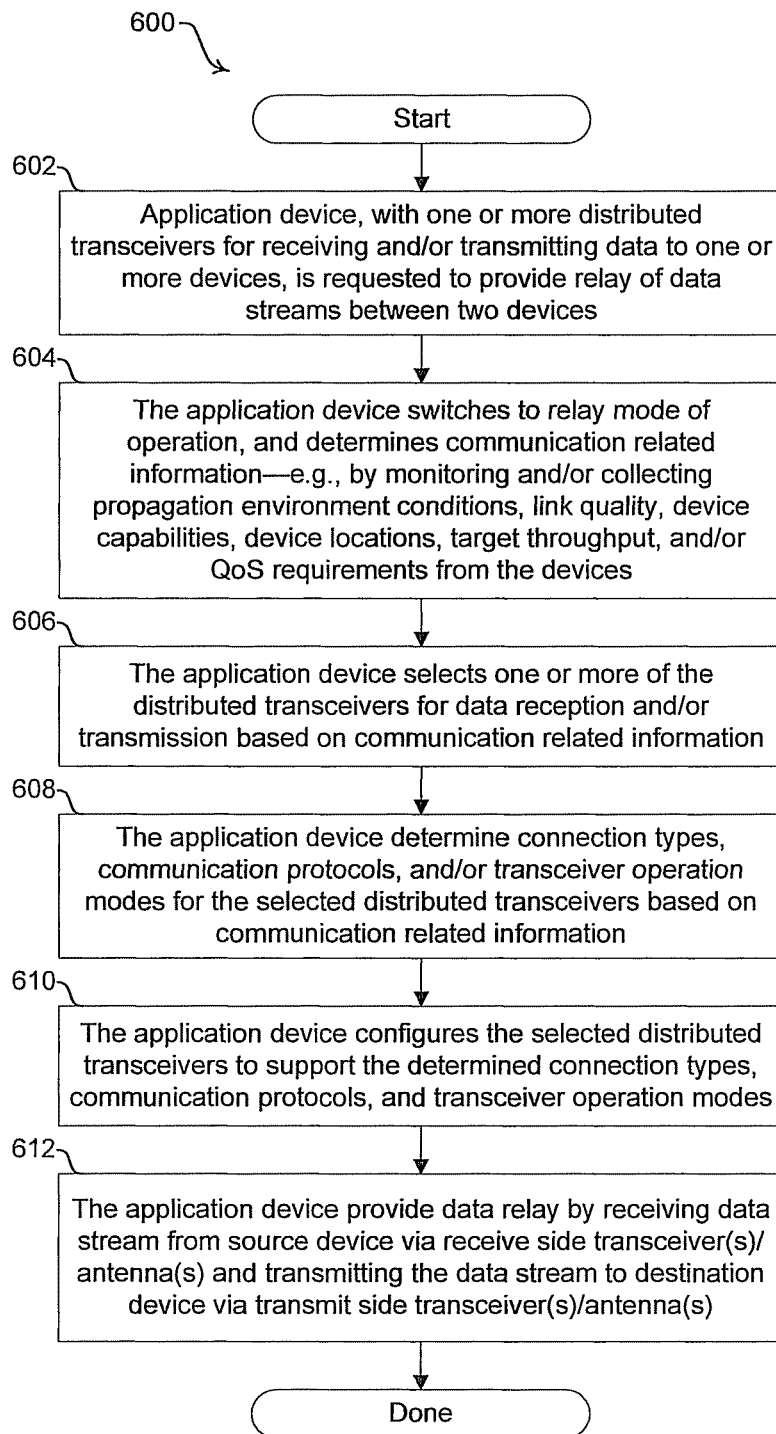
FIG. 6 is a flow chart that illustrates exemplary steps for relaying data streams via a device that comprises distributed transceivers, in accordance with an embodiment of the invention.

FIG. 6 is a flow chart that illustrates exemplary steps for relaying data streams via a device that comprises distributed transceivers, in accordance with an embodiment of the invention. Referring to FIG. 6, there is shown a flow chart 600 comprising a plurality of exemplary steps for performing repeating service in a relay device, such as the relay device 500.

In step 602, an application device with one or more distributed transceivers for receiving and/or transmitting data to one or more devices, such as device 500, may be requested to provide relay of data streams between two devices. For example, the relay device 500 may receive a request from a source device (e.g., the source device 502A) to relay a data stream from the source device to a destination device (e.g., the destination device 502B). In step 604, the application device may switch to a relay mode of operation, and may determine (before or after the switch) communication related information pertinent to the relay mode. In this regard, the application device may monitor and/or collect, for example, propagation environment conditions, link quality, device capabilities, device locations, target throughput, and/or QoS requirements from the devices. In step 606, the application device may select one or more of the distributed transceivers for data reception and/or transmission based on communication related information determined in step 604. In step 608, the application device may determine connection types, communication protocols, and/or transceiver operation modes for the selected distributed transceivers based on communication related information. In step 610, the application device may configure the selected distributed transceivers to support the determined connection types, communication protocols, and transceiver operating modes. In step 612, the application device may provide relay servicing by receiving data stream from the source device via receive side transceiver(s)/antenna(s) and transmitting the data stream to the destination device via transmit side transceiver(s)/antenna(s).

Various embodiments of the invention may comprise a method and system for a repeater network that utilizes distributed transceivers with array processing. The relay device 500 may be configured to operate in a relay mode, in which the relay device 500 may be utilized to relay input data streams from source devices (e.g., 502A or 522A) to one or more destination devices (e.g., 502B or 522B). In this regard, relay operations may comprise configuring one or more of the plurality of distributed transceivers (e.g., transceiver $510_1$ and $510_2$) to operate in a particular mode of relay operation. The input data stream may be then be received from the source device via at least one of the configured distributed transceivers. One or more relay data streams, corresponding to the input data stream, may then be transmitted to the destination device(s), via at least one of the configured distributed transceivers. The destination device(s) may comprise other relay device(s), and/or the intended destination device for the input data stream. The source device may comprise another relay device and/or an original source device for the input data stream. The particular mode of relay operation may be determined, such as by the central processor 520, based on one or more performance criteria, which may pertain to link quality and/or propagation environment.

The particular mode of relay operation may be selected, by the central processor 520, from a plurality of modes of relay operation. In this regard, the plurality of modes of relay operation may comprise a passive mode of relay operation and an active mode of relay operation. The passive mode of relay operation may comprise forwarding the data stream unprocessed The active mode of relay operation may comprise performing digital signal processing by the baseband processor 440 of the relay device 500 during the reception of the input data stream and/or transmission of the at least one relay data stream. The network management engine 430 may monitor during relay operations, one or more communication parameters or conditions associated with the configuration of the one or more of the plurality of distributed transceivers. Beamforming settings and/or antenna arrangement for at least one of the configured distributed transceivers may be configured, via the central processor 520, based on the monitoring. The relay device 500 may determine and/or select connection types and communication protocols that may be applied to the relay operations, and may allocate resources to the one or more of the plurality of distributed transceivers. Resources may be shared among the one or more of the plurality of distributed transceivers during the relay operations.

All the embodiments may be applied to cases where a set of devices are used in relay mode to transfer data from a source device to a destination device. In this case, the data is transferred after several relay hops through intermediate relay devices. Intermediate relay devices utilize their transceivers (in accordance to several of disclosed embodiments) to establish intermediate wireless links.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for repeater network that utilizes distributed transceivers with array processing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a first relay device that comprises a plurality of antenna arrays:
configuring a first beamforming setting for a first set of antenna arrays of the plurality of antenna arrays of the first relay device to establish a first link between the first relay device and a source device;
configuring a second beamforming setting for a second set of antenna arrays of the plurality of antenna arrays of the first relay device to establish a second link between the first relay device and a destination device;
configuring a relay node of a plurality of relay nodes by configuring at least one of the first beamforming setting of the first set of antenna arrays or the second beamforming setting of the second set of antenna arrays,
wherein the plurality of relay nodes are included in a relay mesh,
wherein the at least one of the first beamforming setting for the first set of antenna arrays or the second beamforming setting for the second set of antenna arrays is configured based on a subset of propagation properties of links between the plurality of relay nodes, and
wherein at least one of the source device or the destination device corresponds to a second relay device based on presence of the first relay device in the relay mesh; and
receiving a first data stream from the source device through the first link and forwarding the first data stream to the destination device through the second link via same frequency channel,
wherein the first data stream is received concurrently with the forwarding of the first data stream,
wherein the first data stream is forwarded to the destination device without data de-modulation of the first data stream,
wherein the first data stream is forwarded to the destination device via a plurality of intermediate relay devices based on availability of Line-of-sight (LOS) links between the plurality of relay nodes, and
wherein configuring the first beamforming setting for the first set of antenna arrays and the second beamforming setting for the second sets of antenna arrays comprises phase shifting a signal provided to each antenna element by a different value for elements within the first set of antenna arrays and the second set of antenna arrays.

2. The method according to claim 1, further comprising forwarding a second data stream to an intermediate relay device of the plurality of intermediate relay devices, wherein the first data stream and the second data stream are forwarded by two different antenna arrays of the plurality of antenna arrays of the first relay device via same frequency channel.

3. The method according to claim 1, wherein the source device is concurrently communicating with a plurality of relay devices.

4. The method according to claim 3, further comprising:
configuring at least one of the plurality of antenna arrays to operate in a particular mode of relay operation; and
determining the particular mode of relay operation based on a performance criteria, the performance criteria comprising at least one of link quality of the communication or propagation property of the communication via the plurality of relay nodes.

5. The method according to claim 4, comprising selecting the particular mode of relay operation from a plurality of modes of relay operation.

6. The method according to claim 5, wherein the plurality of modes of relay operation comprises a passive mode of relay operation and an active mode of relay operation, and
wherein the passive mode of relay operation comprising forwarding the first data stream unprocessed and the active mode of relay operation comprising digital signal processing for at least one of the reception of the first data stream or transmission of the first data stream.

7. The method according to claim 1, further comprising monitoring communication parameters associated with at least one of the first set of antenna arrays or the second set of antenna arrays.

8. The method according to claim 7, further comprising configuring at least one of the first beamforming setting for the first set of antenna arrays or the second beamforming setting for the second set of antenna arrays based on the monitoring of the communication parameters.

9. The method according to claim 1, further comprising determining connection types and communication protocols, and allocating resources to the plurality of antenna arrays.

10. The method according to claim 1, wherein the destination device is concurrently communicating with a plurality of relay devices.

11. A system, comprising:
a first relay device that comprises a plurality of antenna arrays, the first relay device is configured to:
configure a first beamforming setting for a first set of antenna arrays of the plurality of antenna arrays of the first relay device to establish a first link between the first relay device and a source device;
configure a second beamforming setting for a second set of antenna arrays of the plurality of antenna arrays of the first relay device to establish a second link between the first relay device and a destination device;
configure a relay node of a plurality of relay nodes by configuring at least one of the first beamforming setting of the first set of antenna arrays or the second beamforming setting of the second set of antenna arrays,
wherein the plurality of relay nodes are included in a relay mesh,
wherein the at least one of the first beamforming setting for the first set of antenna arrays or the second beamforming setting for the second set of antenna arrays is configured based on a subset of propagation properties of links between the plurality of relay nodes, and
wherein at least one of the source device or the destination device corresponds to a second relay device based on presence of the first relay device in the relay mesh; and
receive a first data stream from the source device through the first link and forward the first data stream to the destination device through the second link via same frequency channel,
wherein the first data stream is received concurrently with the forwarding of the first data stream,
wherein the first data stream is forwarded to the destination device without data de-modulation of the first data stream,
wherein the first data stream is forwarded to the destination device via a plurality of intermediate relay devices based on availability of Line-of-sight (LOS) links between the plurality of relay nodes, and
wherein the first beamforming setting for the first set of antenna arrays and the second beamforming setting for the second sets of antenna arrays are configured based on phase shifting a signal provided to each antenna element by a different value for elements within the first set of antenna arrays and the second set of antenna arrays.

12. The system according to claim 11, wherein the first relay device is further configured to forward a second data stream to an intermediate relay device of the plurality of intermediate relay devices, and
wherein the first data stream and the second data stream are forwarded by two different antenna arrays of the plurality of antenna arrays of the first relay device via same frequency channel.

13. The system according to claim 11, wherein the source device is concurrently communicating with a plurality of relay devices.

14. The system according to claim 13, wherein the first relay device is further configured to:
configure at least one of the plurality of antenna arrays to operate in a particular mode of relay operation; and
determine the particular mode of relay operation based on a performance criteria, the performance criteria comprising at least one of link quality of the communication or propagation property of the communication via the plurality of relay nodes.

15. The system according to claim 14, wherein the first relay device is further configured to select the particular mode of relay operation from a plurality of modes of relay operation.

16. The system according to claim 15, wherein the plurality of modes of relay operation comprises a passive mode of relay operation and an active mode of relay operation, and
wherein the passive mode of relay operation comprises forwarding the first data stream unprocessed and the active mode of relay operation comprises digital signal processing for at least one of the reception of the first data stream or transmission of the first data stream.

17. The system according to claim 11, wherein the first relay device is further configured to monitor communication parameters associated with at least one of the first set of antenna arrays or the second set of antenna arrays.

18. The system according to claim 17, wherein the first relay device is further configured to configure at least one of the first beamforming setting for the first set of antenna arrays or the second beamforming setting for the second set of antenna arrays based on the monitoring of the communication parameters.

19. The system according to claim 11, wherein the first relay device is further configured to determine connection types and communication protocols, and allocate resources to the plurality of antenna arrays.

20. The system according to claim 11, wherein the destination device is concurrently communicating with a plurality of relay devices.

\* \* \* \* \*